(12) United States Patent
Miller

(10) Patent No.: US 10,696,393 B2
(45) Date of Patent: Jun. 30, 2020

(54) DEVICE FOR CONTROLLING AND STEERING TRACTION KITES OR ROTATING FLYER WHEELS FOR ELECTRICITY GENERATION

(71) Applicant: Bernhard Miller, Weil der Stadt (DE)

(72) Inventor: Bernhard Miller, Weil der Stadt (DE)

( * ) Notice: Subject to any disclaimer, the term of this patent is extended or adjusted under 35 U.S.C. 154(b) by 664 days.

(21) Appl. No.: 15/307,047

(22) PCT Filed: Apr. 28, 2015

(86) PCT No.: PCT/EP2015/059228
§ 371 (c)(1),
(2) Date: Feb. 10, 2017

(87) PCT Pub. No.: WO2015/165913
PCT Pub. Date: Nov. 5, 2015

(65) Prior Publication Data
US 2017/0191467 A1    Jul. 6, 2017

(30) Foreign Application Priority Data
Apr. 28, 2014   (DE) .................. 10 2014 105 944

(51) Int. Cl.
*B64C 31/06*    (2020.01)
*F03D 5/00*    (2006.01)
(Continued)

(52) U.S. Cl.
CPC ............... *B64C 31/06* (2013.01); *F03D 5/00* (2013.01); *F03D 9/007* (2013.01); *F03D 9/008* (2013.01); *F03D 9/10* (2016.05); *F03D 9/17* (2016.05); *F03D 9/25* (2016.05); *F03D 9/30* (2016.05); *F03D 9/32* (2016.05); *F03D 13/25* (2016.05); *F03D 15/00* (2016.05); *F05B 2240/917* (2013.01); *F05B 2240/921* (2013.01); *F05B 2240/95* (2013.01); *Y02B 10/30* (2013.01);
(Continued)

(58) Field of Classification Search
CPC ..... B64C 31/06; B64C 39/022; A63H 27/002; A63H 27/004; F03D 5/00; F03D 5/002; F03D 5/04; F03D 5/06
See application file for complete search history.

(56) References Cited

U.S. PATENT DOCUMENTS

| | | | |
|---|---|---|---|
| 2010/0019091 A1* | 1/2010 | Milanese | ............ B63B 35/7979 244/155 A |
| 2011/0025060 A1 | 2/2011 | Toneaki | |
| 2013/0134261 A1 | 5/2013 | Goldstein | |

FOREIGN PATENT DOCUMENTS

| | | |
|---|---|---|
| DE | 2437003 A1 | 2/1976 |
| DE | 102008047261 A1 | 4/2010 |
| WO | 2008/034421 A2 | 3/2008 |

OTHER PUBLICATIONS

International search report for application No. PCT/EP2015/059228 dated Apr. 28, 2015.

* cited by examiner

*Primary Examiner* — Nicholas McFall
(74) *Attorney, Agent, or Firm* — Bachman and LaPointe PC; George Coury

(57) ABSTRACT

A device for a traction kite for generating electricity by means of wind force, wherein exact horizontal positioning of a traction kite or of a group of interconnected traction kites or rotating flyer wheels is made possible in that obliquely braced additional traction ropes 4 at the edges of this traction kite group permit a fixed position of the traction kite, similar to when bracing domestic tents.

4 Claims, 26 Drawing Sheets

(51) Int. Cl.
*F03D 9/00* (2016.01)
*F03D 9/30* (2016.01)
*F03D 9/25* (2016.01)
*F03D 9/10* (2016.01)
*F03D 9/17* (2016.01)
*F03D 9/32* (2016.01)
*F03D 13/25* (2016.01)
*F03D 15/00* (2016.01)

(52) U.S. Cl.
CPC ............... *Y02B 10/70* (2013.01); *Y02E 10/70* (2013.01); *Y02E 10/725* (2013.01); *Y02E 10/727* (2013.01); *Y02E 10/728* (2013.01); *Y02E 60/15* (2013.01)

Side-on to the wind direction

In the wind direction

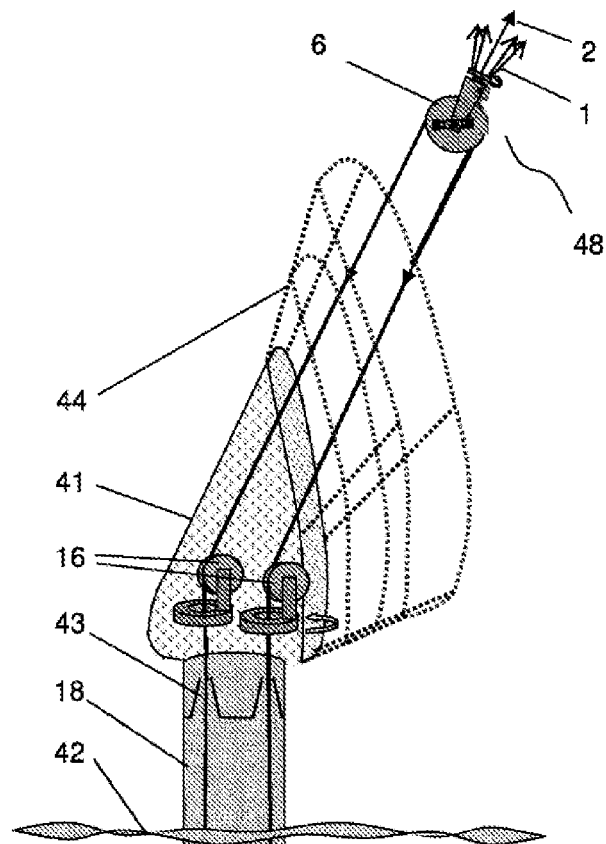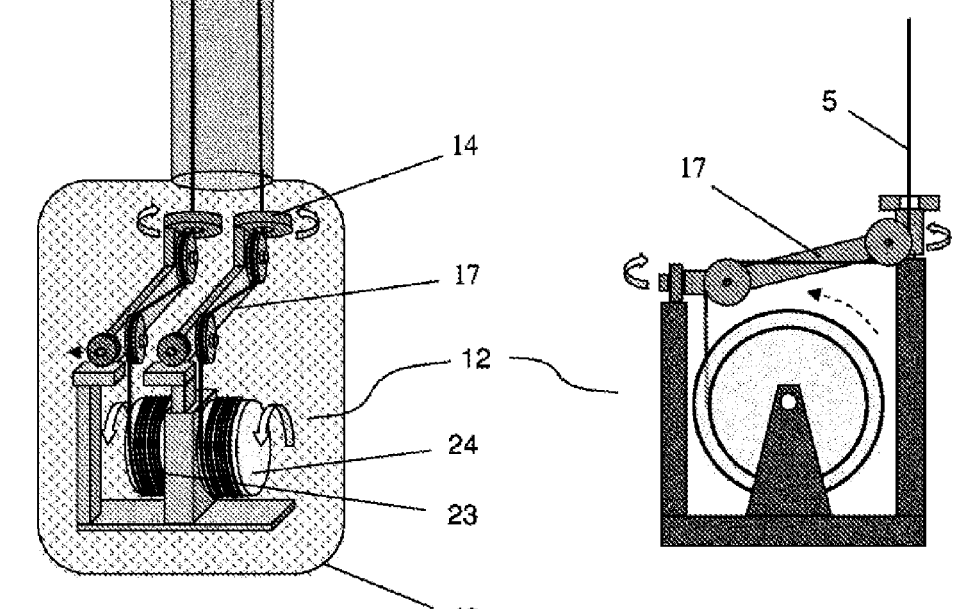
Figure 10
Figure 11

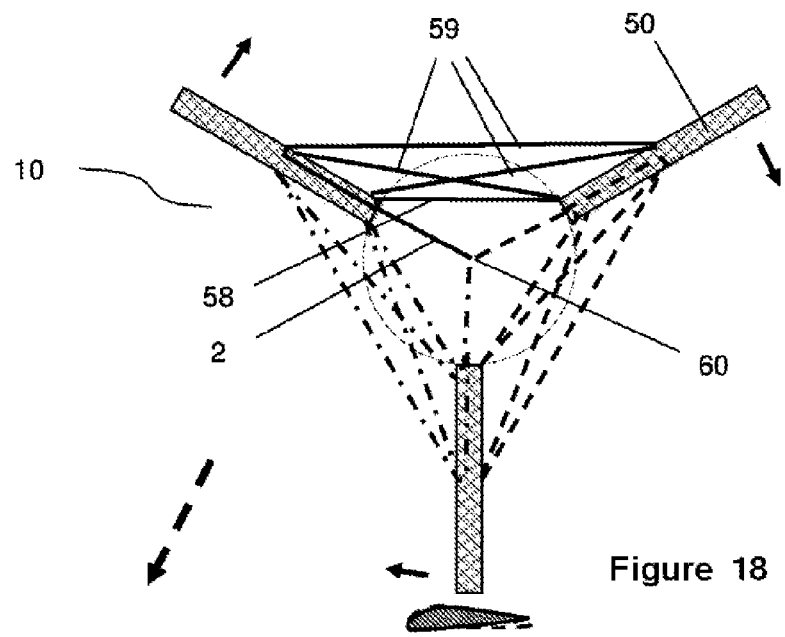
Figure 18
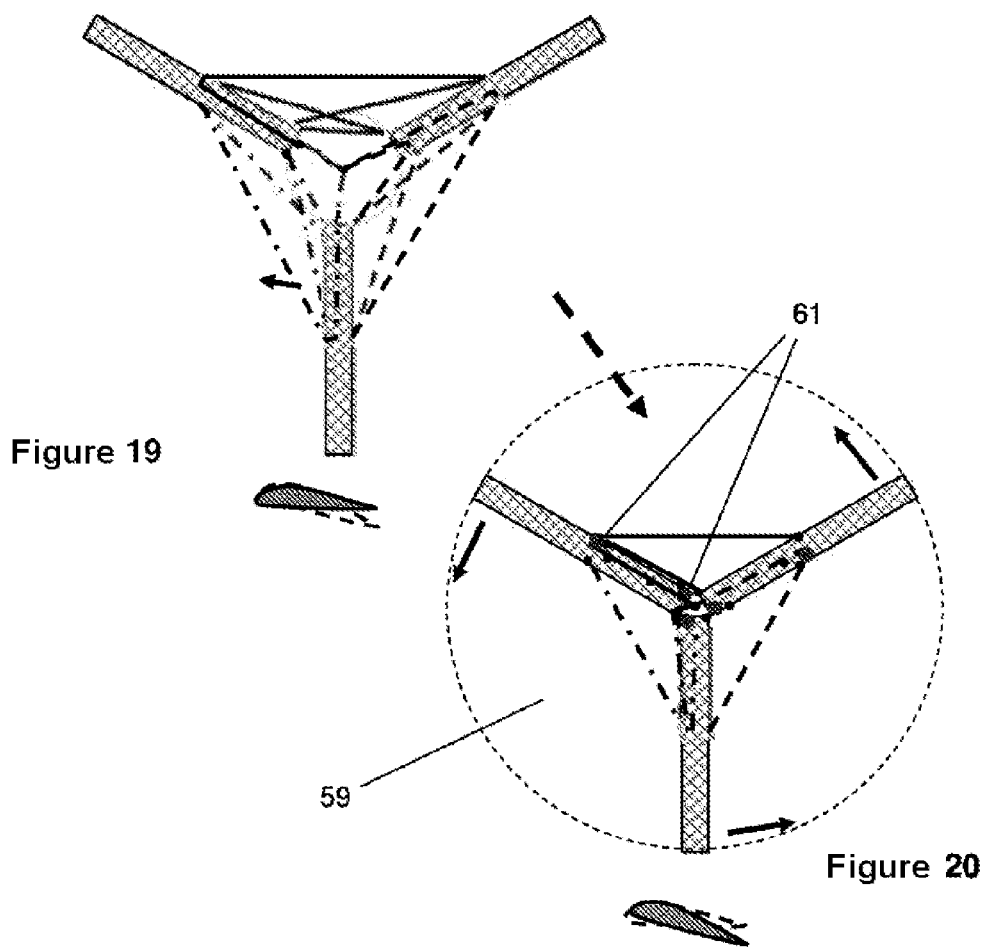
Figure 19
Figure 20

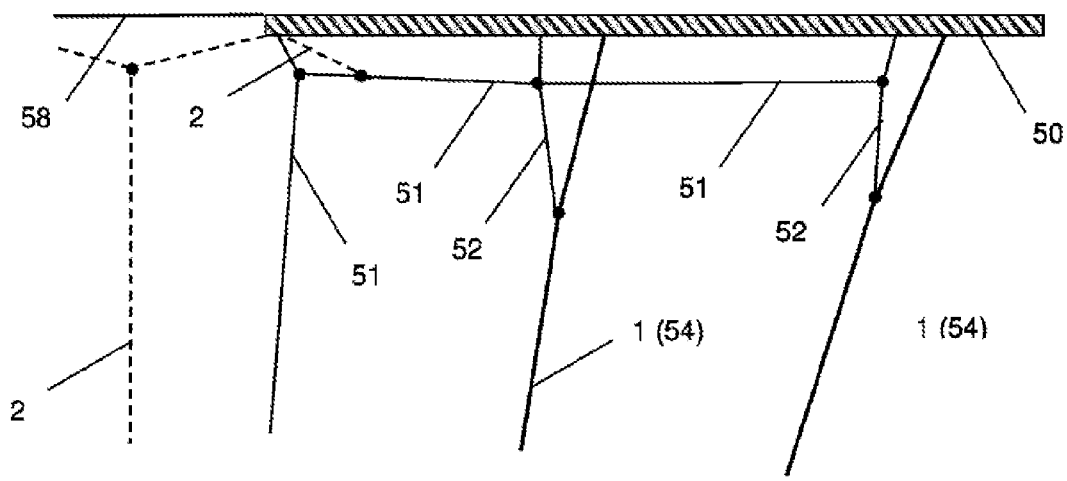
Figure 21
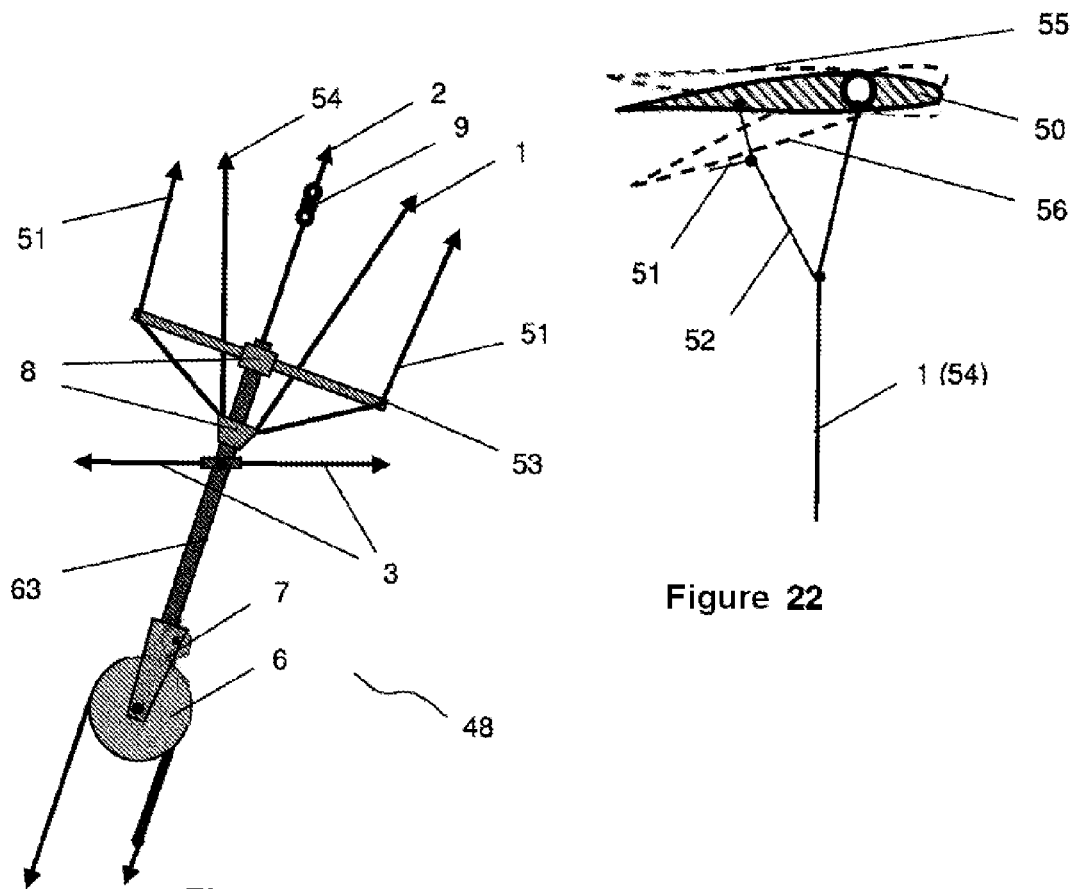
Figure 22
Figure 23

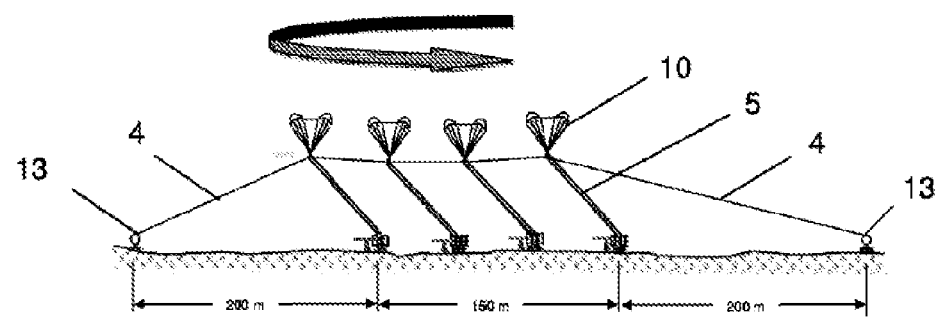
Figure 26
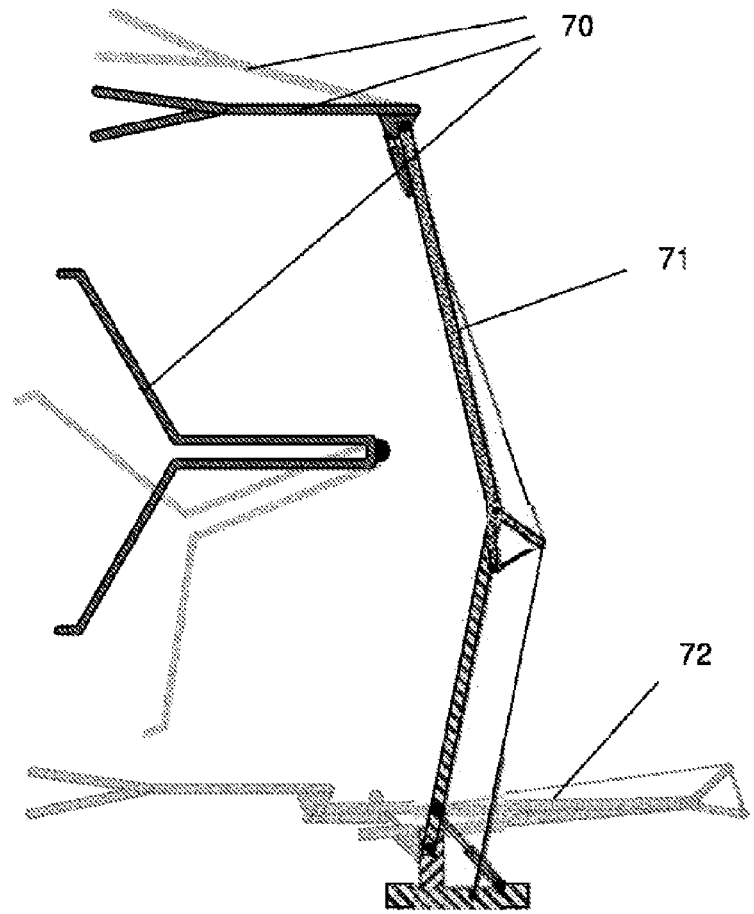
Figure 27a
Figure 27b

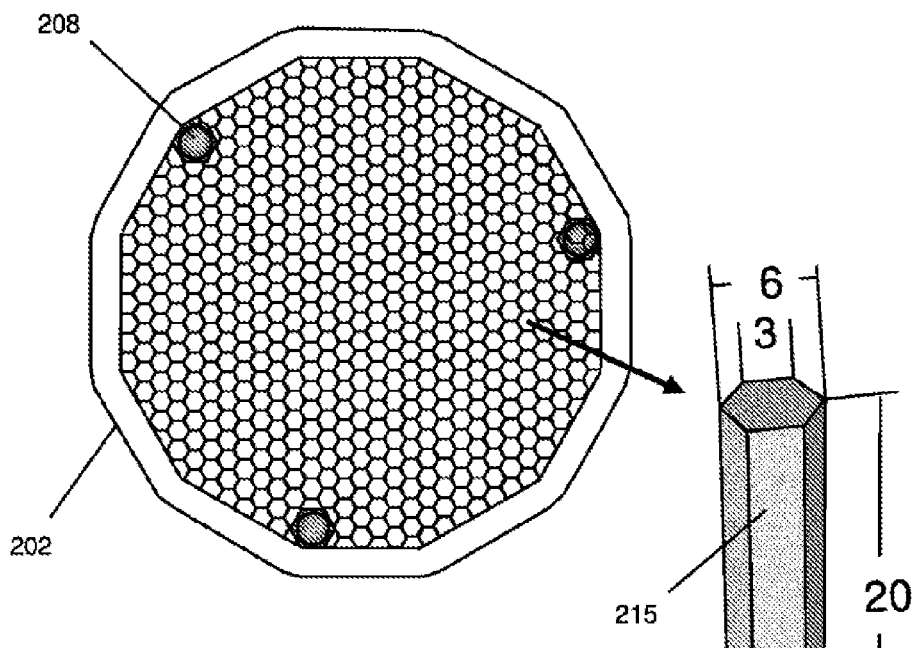
Figure 36
Figure 37
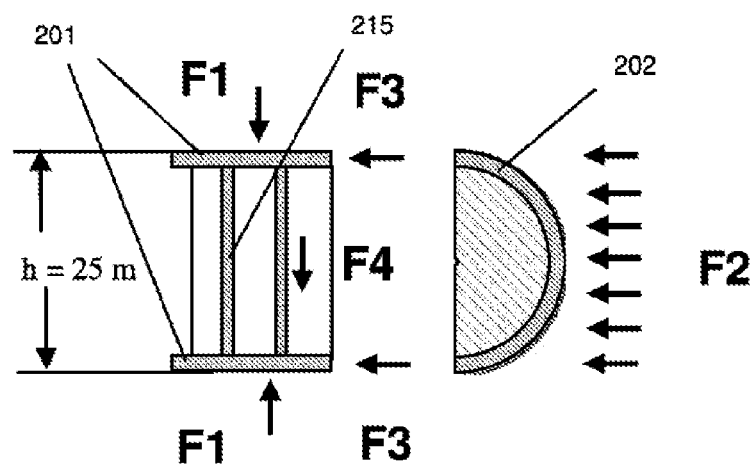
Figure 38

DEVICE FOR CONTROLLING AND STEERING TRACTION KITES OR ROTATING FLYER WHEELS FOR ELECTRICITY GENERATION

BACKGROUND OF THE INVENTION

The invention relates to a device for controlling and steering traction kites.

PRIOR ART

Wind turbine systems with rotary drive are already widespread in the generation of electricity from the force of the wind. Furthermore, multifarious possible ways of using wind energy are already known, for example including the generation of electricity by means of traction kites. Here, the paying-out of one or more traction kites for generating electricity is used, as known, for example, from laid-open specification DE 10 2008 047 261 A1.

Statement of the Problem

To position and control the traction kites, additional control devices have to be created, such as the fitting of motor-driven control ropes underneath or in the respective traction kite. Because of the restricted positioning accuracy, a considerable distance between individual groups of traction kites is needed.

In addition, the base station in various designs is rotatably or movably mounted, which means additional technical outlay and makes the system more expensive.

SUMMARY OF THE INVENTION

Solution

The features disclosed herein lead to the solution.

In the application described here, a device for controlling and steering traction kites, which is used for generating electricity from the force of the wind, is described.

BRIEF DESCRIPTION OF THE DRAWINGS

FIG. 11 shows, in a side view, the rope winch 12 having a device for rope guidance FIGS. 18a to 20 show in a plan view a flyer wheel comprising three individual rotating blades, instead of a traction kite FIG. 18 shows this flyer wheel in a normal operating position during paying-out with widespread blades, which are connected to one another only by means of ropes FIG. 19 shows this flyer wheel at the transition of the collapsing of the three blades toward the rotational center FIG. 20, finally, shows the flyer wheel in the completely collapsed position as it is hauled in, here the blades being connected to one another and the flyer wheel rotating in the opposite direction of rotation FIG. 21 shows from the front a blade held by means of ropes, which adapts the angle of attack as a function of rotation FIG. 22 shows the same blade in profile at its various angles of attack FIG. 23 shows the deflection roller with the two traction ropes and a rotation-dependent adjusting device for the angle of attack of the flyer wheel FIG. 26 shows how, as the flyer wheel is started with the aid of the outer rope winches, are raised by means of circular movements. In doing so, the flyer wheels can also be raised up to a certain starting height even in the case of no wind.

FIGS. 27a and 27b show a holding device for holding a flyer wheel in a side view FIG. 28 likewise shows the holding device with the flyer wheel in a side view FIG. 36 shows, in a section in a plan view, a further variant of a store with octagonal outer shape FIG. 37 shows, in a three-dimensioned illustration, honeycomb-shaped module for vertical physical support FIG. 38 makes clear, in a lateral sectional illustration, the force profile of the forces acting on the storage container from outside as a result of the high water pressure

DETAILED DESCRIPTION

Figure 1:
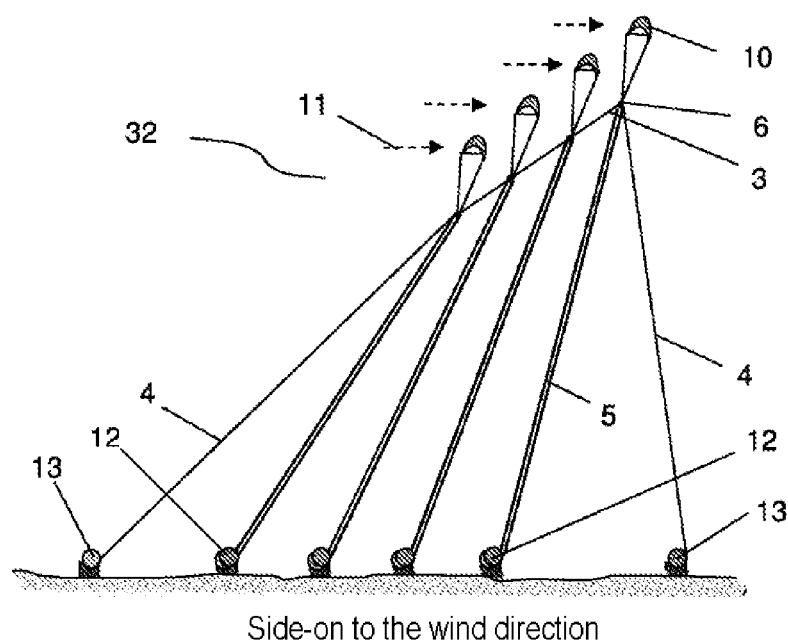
FIG. 1 shows a section-like lateral illustration of a canopy group 32 transverse to the wind direction, comprising four canopies 10 with respectively illustrated traction ropes 5 and two lateral guide ropes 4

In order to control the pulling force, the traction kites of the invention described here each have two traction ropes. These traction ropes 5 are preferably loaded uniformly by using a deflection roller 6. With the aid of a relative change in length of the traction ropes amongst one another, the effective pulling force can be varied. Therefore, during the paying-out process, the pulling force of each kite can be adjusted to a constant intended pulling force, irrespective of the strength of the wind. After the maximum desired elevation has been reached, the pulling force is minimized and the canopies are hauled in again.

The individual traction kites are connected to one another in a net-like manner by means of connecting ropes 3.

Grouping of Traction Kites

In order to minimize the number of connecting ropes to the base stations, instead of individual traction kites it is proposed to combine a plurality of traction kites that are interconnected and moved uniformly to form a group. Each traction kite within this group is connected to its adjacent traction kite in a net-like manner by means of connecting ropes 3 for this purpose and therefore needs only 2 traction ropes for pulling force adjustment and transmission.

For the purpose of the horizontal fixing of the position of this traction kite group, positioning ropes 4, which run obliquely downward, are braced at the rope deflection rollers 6 of the respective outer traction kites, as is known in principle from the stabilization of tents. The two traction ropes 5 then, so to speak, perform the function of the tent pegs.

As a result of the use of the positioning ropes 4, despite a relatively great working height, accurate positioning of the traction kite combination is made possible, which is advantageous in particular in relatively large wind parks, since therefore the minimum distance from the respectively adjacent traction kite groups can be minimized, and thus intensive utilization of the area of the wind park is achieved.

The horizontal alignment of the respective traction kite group is nevertheless maintained in the event of a change in the wind direction. Only the individual canopies and their canopy traction ropes 1 rotate in accordance with the wind direction, with the aid of a rotary bearing 8 and a rope rotator 9. In relation to the height, the individual traction kites of a respective group can optionally be arranged at the same height or else with a specific height offset. Therefore, in the event of horizontal movements of the kite group, air turbulence of the adjacent traction kites can be minimized.

Measuring the Wind Direction and Horizontal Positioning

The current wind direction can be determined by measuring the respective pulling force and rope lengths of the respective positioning ropes 4, based on the traction rope lengths 5.

Figure 2A:
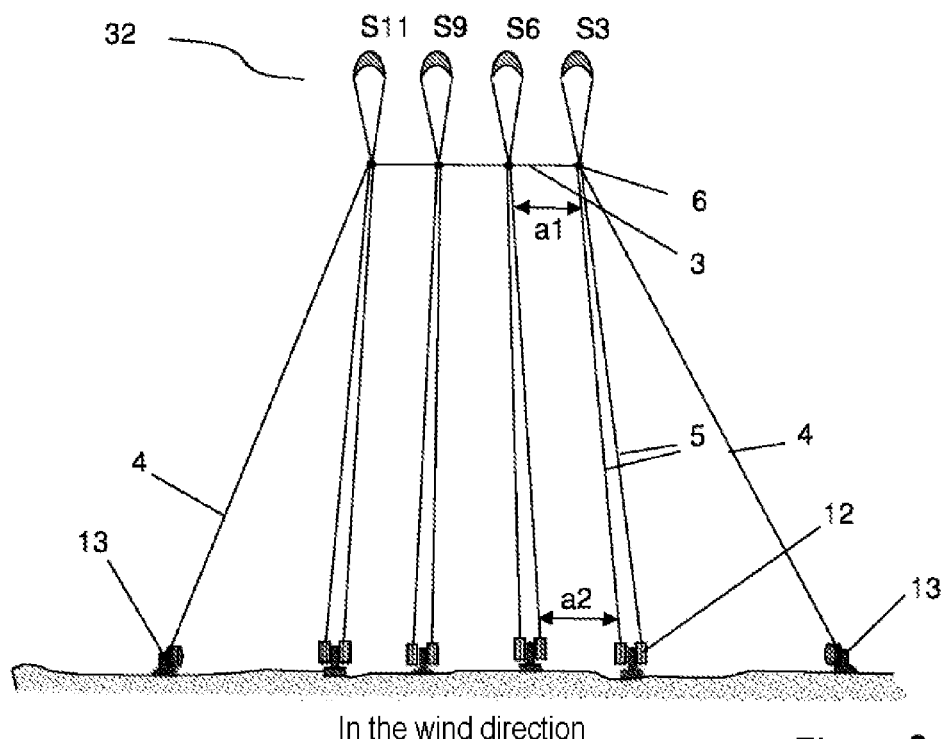
FIG. 2a shows a section-like illustration, as in FIG. 1, of this canopy group 32 in the wind direction (from the front)

The pulling force of the outer traction kites, e.g. S3 as illustrated in FIG. 2a, is divided up into a pulling force of the two traction ropes 5 and the laterally braced positioning ropes 4. As a result, a horizontal force is produced on the traction kite connecting ropes 3. Therefore, maintaining the distance of the individual traction kites from one another can be ensured.

In addition, the traction kite combination 32 can therefore be aligned accurately in its horizontal position with respect to the current wind direction.

If, for example, the rope length of the right-hand positioning rope 4, as illustrated in FIG. 2a, is shortened, then the pulling force of the canopy S3 on the traction ropes 5 decreases and a horizontal force to the right is produced on the connecting rope 3 between canopy S3 and S6.

This positioning is also assisted by the fact that, as illustrated in FIG. 2a, in the event of a threatening overload on the left-hand positioning rope 4, the pulling forces of the canopies S11 and S9 are increased and/or the pulling forces of the traction kites S6 and S3 are reduced somewhat.

Figure 2B:
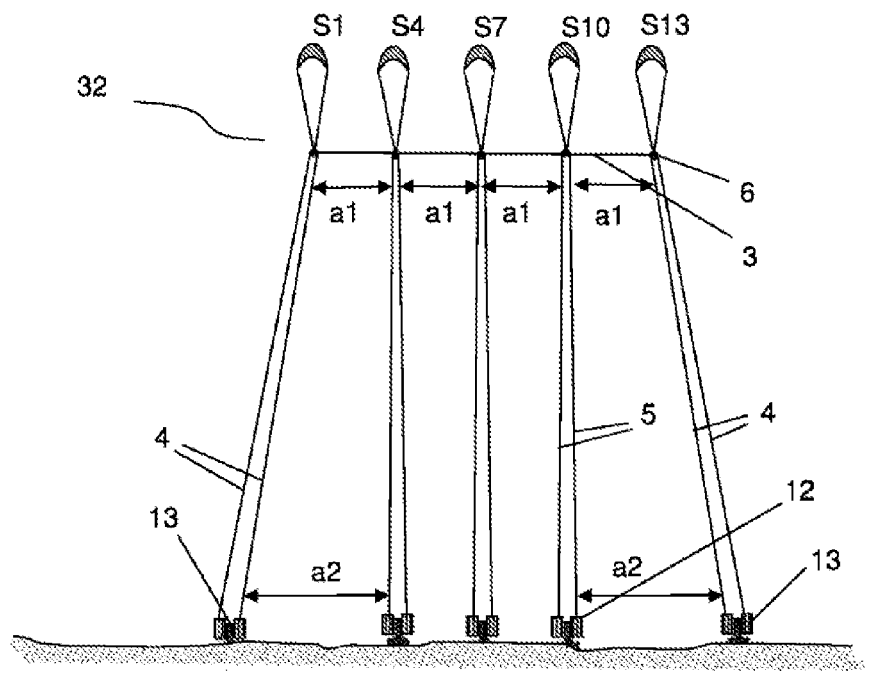
FIGS. 2b and 2c show a similar arrangement of this traction kite group
Figure 2C:
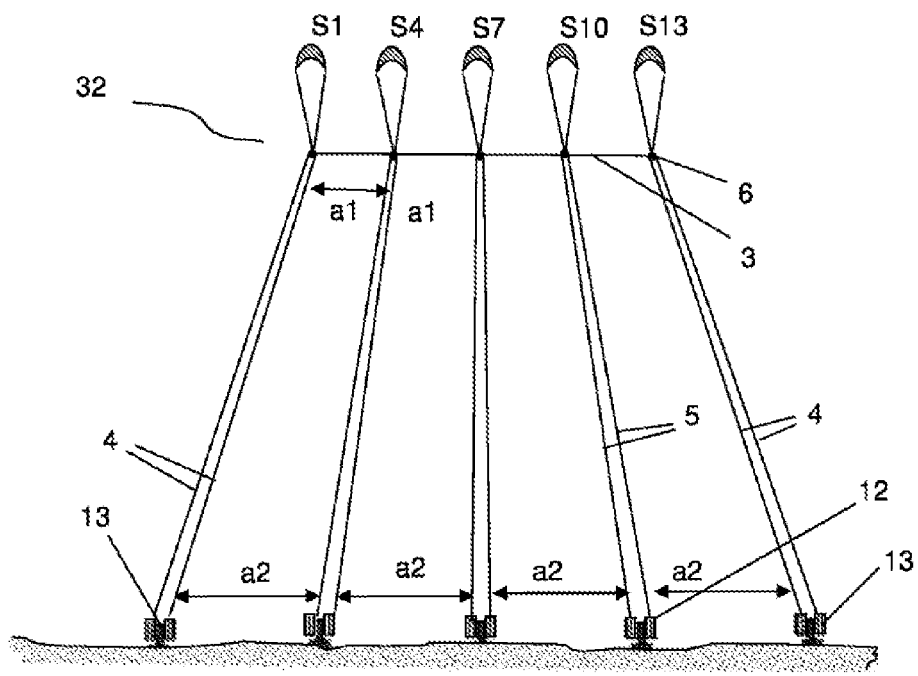
Figure 5A:
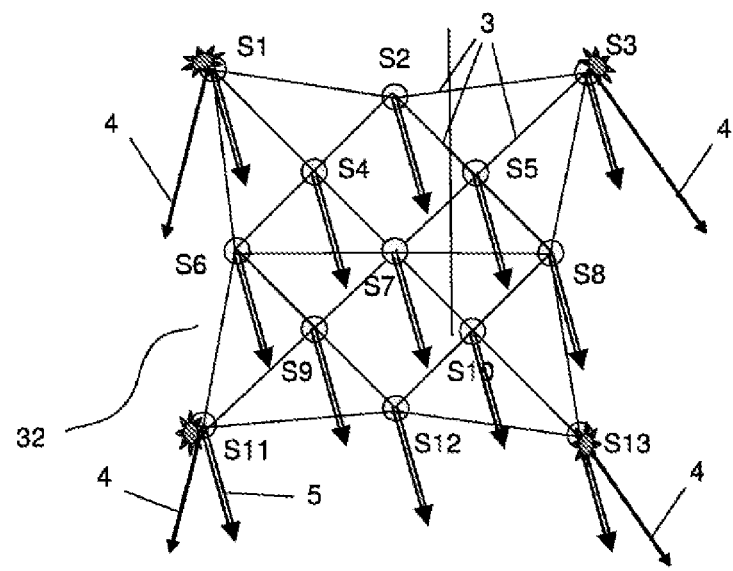

As a result of the shorter distance a1 (see FIGS. 2a to 2c) between the canopies S6 and S3, compared with the greater horizontal distance a2 of the respective rope winches 12 and 13, in addition or alternatively to the increased pulling force of the left-hand positioning rope 4, an additional force acting horizontally to the left is also produced. As a result, even relatively larger kite combinations, as illustrated in FIG. 5, for example, can be operated with comparatively few positioning ropes 4 or entirely without the latter. FIGS. 2b and 2c finally show a traction kite combination which is also operated without additional positioning ropes 4. Here, the horizontal positioning is achieved solely by means of a relative adaptation of the pulling force of the respective outer traction kites of the respective traction kite combination.

By means of these positioning aids, the kite combination can also fly figures, for example in the form of an 8, which, in the event of low wind strength, lead to an increase in the usable pulling forces. With the aid of the rotary bearing 8 and the rotator 9, simple endlessly circular movements of the traction kite group 32 can also be executed.

Figure 3:
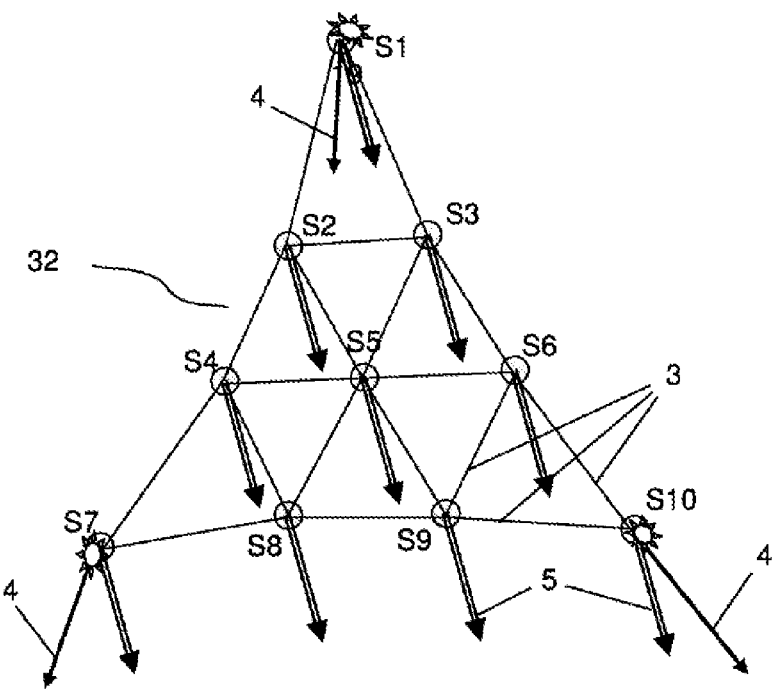
FIG. 3 shows, in a plan view, a group of ten traction kites 10 which are connected to one another by net-like connecting ropes 3 and are guided in their horizontal position (offset respectively by 120°) by three further guide ropes 4

For exact detection of the position of the traction kite group, three positioning ropes 4 each offset by 120° are already sufficient, as shown in FIG. 3.

The control of the pulling forces of all the kites involved in a traction kite group is carried out by measuring all the pulling forces on all the traction ropes 5 and possibly 4. These pulling forces are continuously re-calculated and corrected in accordance with the desired intended values. This is carried out by appropriately adapted paying-out or hauling speeds on all the rope winches 12, 13. As a result, overloads on all the canopies, rope sections and on the individual rope winches are avoided and the traction kites are each positioned optimally with respect to wind direction and pulling force.

In addition, the paying-out and hauling speeds of all the rope winches can be calculated and therefore selected such that a continuous optimum electrical power to be output can be achieved with simultaneous dimensional stability of the traction kite combination 32 and protection against overloading by squalls.

A further advantage of a combination of a plurality of traction kites consists in the safety against an undesired crash of an individual traction kite, be it as a result of breakage of a cable, the failure of a cable winch 12, 13 or a defect on one of the canopies. This is of particular importance, since these traction kites operate at great heights and thus danger in the environment of the system as a result of an undesired crash is avoided. This safety is increased by the design of a high possible haul-in speed. This is designed in such a way that even in the event of a sudden complete failure of the wind, the possible haul-in speed is higher than the sinking speed of the canopies.

Types of Kite Combinations

Figure 4:
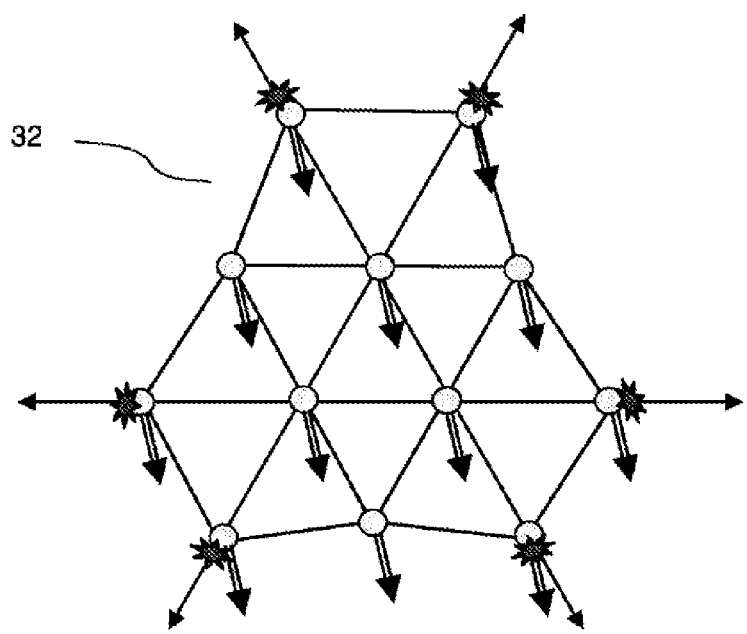
FIG. 4 shows, in a plan view in a similar way to FIG. 3, a somewhat larger group of 12 traction kites which, in this example, are guided horizontally by six guide ropes 4, offset by respectively 60° in their horizontal position FIG. 5, finally, shows two further groups of 13 and 19 traction kites in a plan view in a similar way to FIGS. 3 and 4

The respective composition, shape and scope of the traction kites belonging together in a kite combination is illustrated by using FIGS. 3, 4 and 5.

A small combination of 10 individual traction kites is illustrated in FIG. 3. Each of these traction kites is kept together or at a distance from its respectively adjacent traction kites in the horizontal direction by two (S1, S7, S10), four or 6 (S8) kite connecting ropes 3 running in different directions.

FIG. 4 shows a group consisting of 12 canopies. FIG. 5 shows further possible group arrangements of, for example, 13 and 19 canopies, respectively, which are connected to one another in a rectangular hexagonal arrangement, for example, and are equipped by means of four, six or even 12 positioning ropes.

Figure 5B:
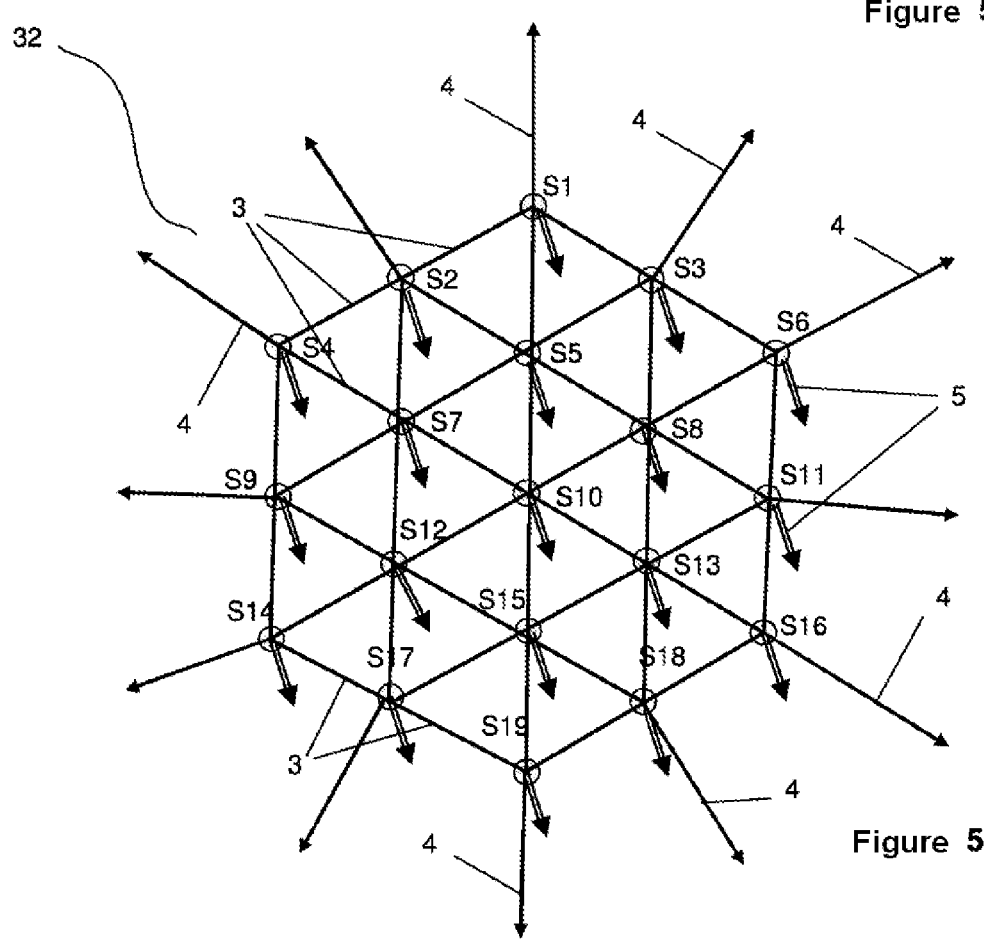

A greater combination of, by way of example here, 19 individual traction kites S1-S19 is illustrated in FIG. 5b. Each individual traction kite is kept horizontally at a distance from adjacent traction kites by 6 traction kite connecting ropes running in different directions.

At the edges, at a horizontal angular distance of 60° in each case, six positioning ropes 4 running obliquely are led to a respective rope drum.

In the event of sharp squalls which also further vary in their wind direction, the kites can be operated somewhat more close to the ground. As a result, the lateral bracing angle on the positioning ropes increases, so that a greater bracing force is produced between the traction kite connecting ropes 3. With a more gentle wind and more constant wind direction, on the other hand, the kites can be brought to a higher position, since the wind force increases considerably with increasing height.

A small combination of 12 individual traction kites is illustrated in FIG. 4, being equipped by six positioning ropes 4 which are connected to their respective rope winch 13 at a horizontal angle of respectively 60°.

Rotation of the Traction Kites with Rotationally Fixed Rope Deflection Rollers

Figure 6:
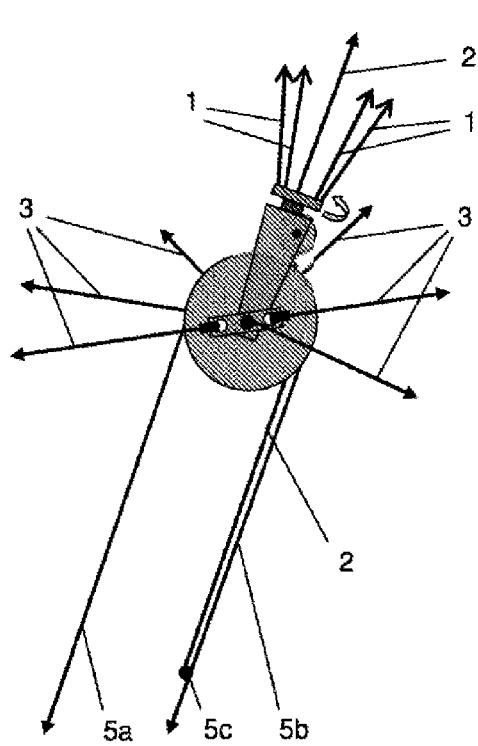
FIG. 6 shows the attachment of the two traction ropes on the traction kites using the example of a traction kite in a central arrangement within a group of traction kites having four positioning pulling ropes
Figure 7:
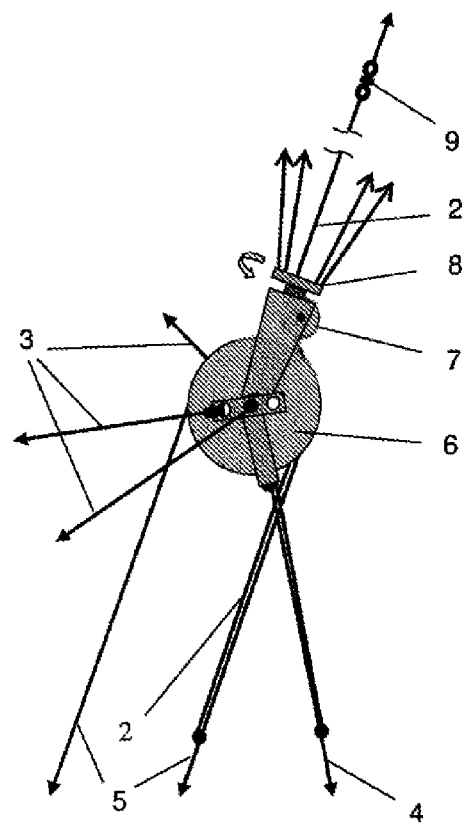
FIG. 7 shows a detailed illustration of an identical deflection roller 6, but here at the edge of a traction kite group 32 having an additional positioning rope 4 braced obliquely downward

The rope deflection roller 6 has two rope grooves, as illustrated in FIGS. 6 and 7. One groove is for the deflection of the traction rope 5, while the second groove deflects the canopy control rope 2 and feeds the control rope deflection roller 7. This canopy control rope can therefore transmit the relative changing length of the two traction ropes on the traction kites further. Here, the canopy control rope is led through the central opening in the rotary bearing 8. By means of a rope rotator 9, the twisting of the canopy control rope during rotational rotary movements of the traction kite with respect to the rotationally fixed rope deflection roller is prevented.

Therefore, the kite group 32 is able to execute circular movements continuously, which leads to an increase in pulling force. With the aid of the rotator 9 and rotary bearing 8 of the individual canopies, the latter can execute endlessly circular movements.

Changing the pulling force—protection against squalls

Sharp squalls can lead to overloading of the traction rope or of the traction kite.

By means of continuously measuring the pulling force of the traction ropes 5, the pulling force of the canopy can be reduced by means of changing the relative lengths of the two traction ropes 5, and can therefore be matched to the desired intended value.

For a fast and automatically adjusting compensation of force, one of the two traction ropes can be formed with a higher elasticity. If, as illustrated in FIG. 6, for example, the traction rope 5a is formed less elastically than the traction rope 5b, the length of the canopy control rope 2 decreases, since this canopy control rope is connected to the traction rope 5b. The same effect can also be achieved by both traction ropes 5a, 5b having the same elasticity but the pulling force on the side of the traction rope 5b being increased via the canopy control rope 2, and thus greater rope stretch occurring on this side in the event of squalls.

These wind turbine systems are not location-dependent and can therefore be installed in the vicinity of high-powered industrial centers or as offshore systems or even in deep waters.

Rotationally Fixed Base Station

Figure 8:
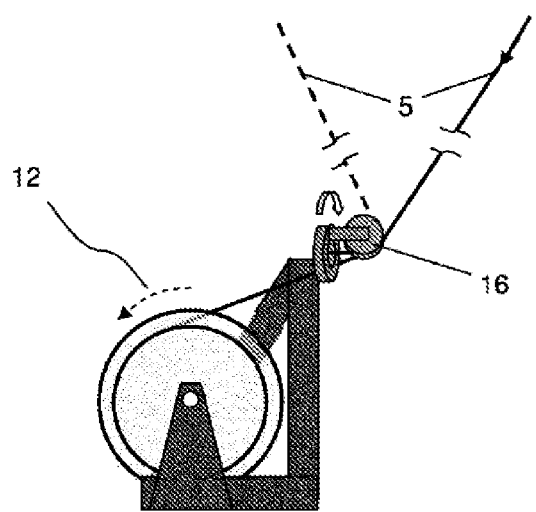
FIG. 8 shows a rope drum placed in a fixed location for onshore applications in a side view, having a vertically rotatably mounted deflection roller

FIG. 8 shows a rotationally fixedly placed rope drum 12. With the aid of a second vertically rotatable deflection roller 16, the traction rope 5 can track in the event of any wind direction.

Figure 24A:
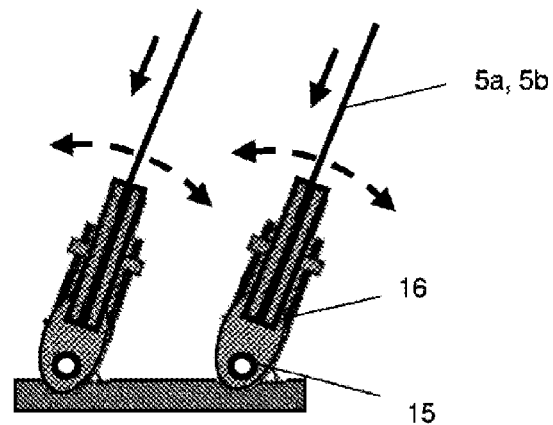
FIGS. 24a and 24b show the arrangement of the rope drum and of the deflection roller in a different side view
Figure 24B:
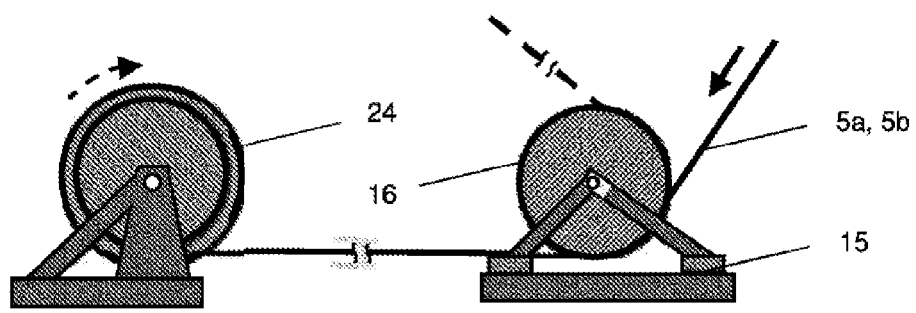

A further similarly acting embodiment is illustrated by FIGS. 24a and 24b.

Figure 25:
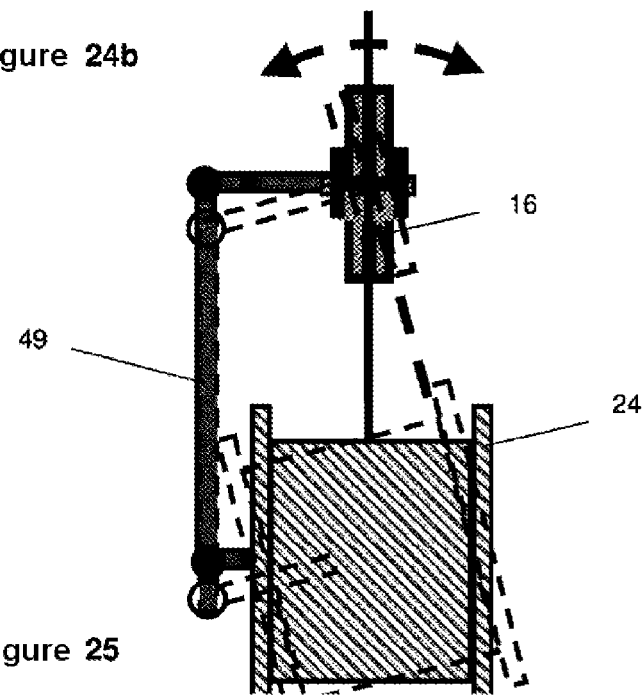
FIG. 25 shows a rotatable rope drum in a plan view. Here, the deflection roller performs the rope guidance as the rope is wound up

In FIG. 25, the rope deflection roller also performs the rope guidance when winding up the rope on the rope drum. Rope drum and rope deflection roller are rotatably horizontally mounted for this purpose and are driven at the same angle via a guide rod.

The rope drum and rope deflection roller are tracked synchronously such that the rope always runs at right angles to the rope drum during the winding phase.

Figure 9:
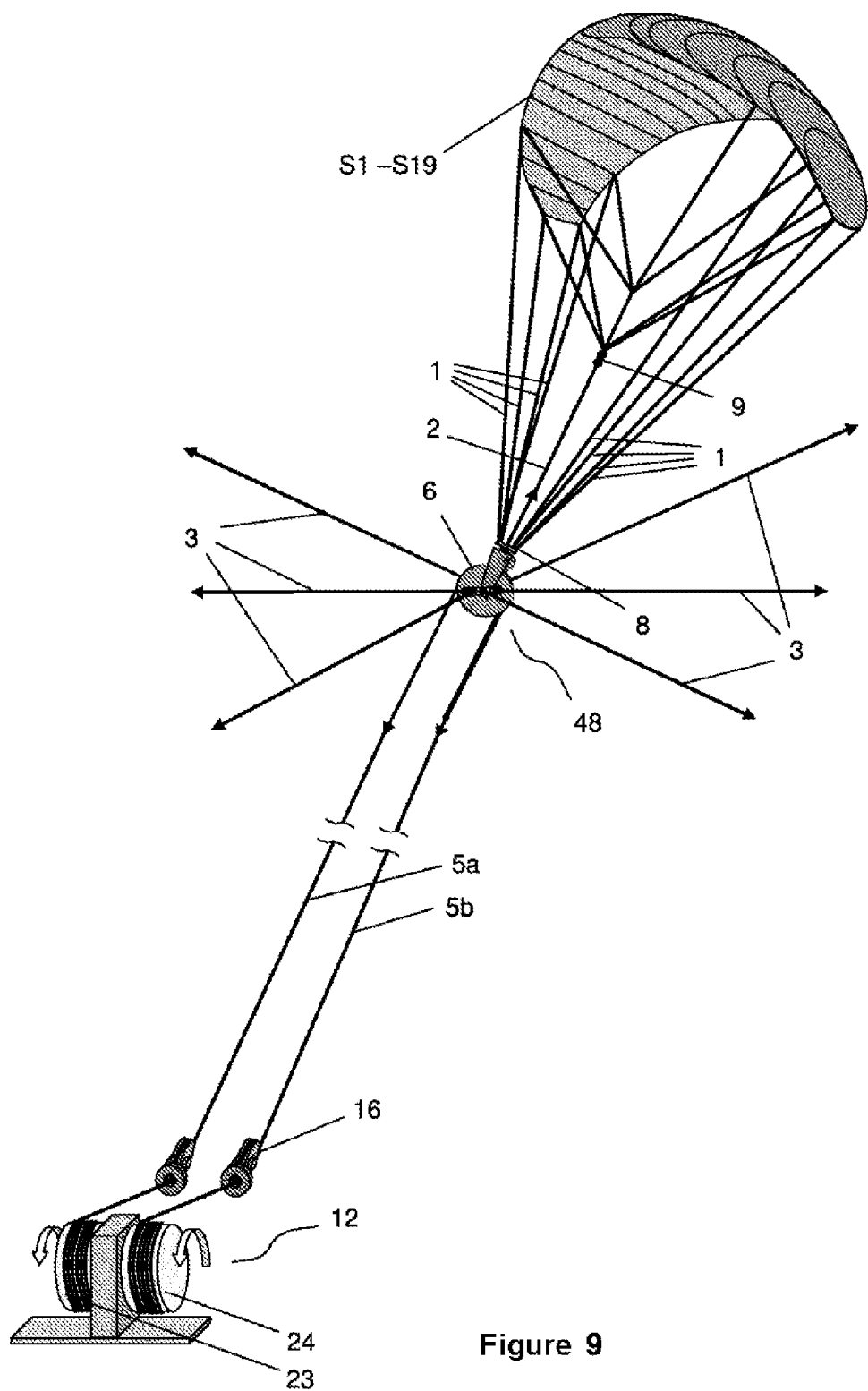
FIG. 9 shows a complete system structure of a double-rope drum 23, 24 including a traction kite 10 with outgoing connecting ropes 3 in various directions FIG. 10, like FIG. 8, shows a base station for offshore application with a buoyant or submersible base station having a device for rope guidance 17

The entire rope run of a single canopy is illustrated in FIG. 9.

Offshore Application

Figure 14:
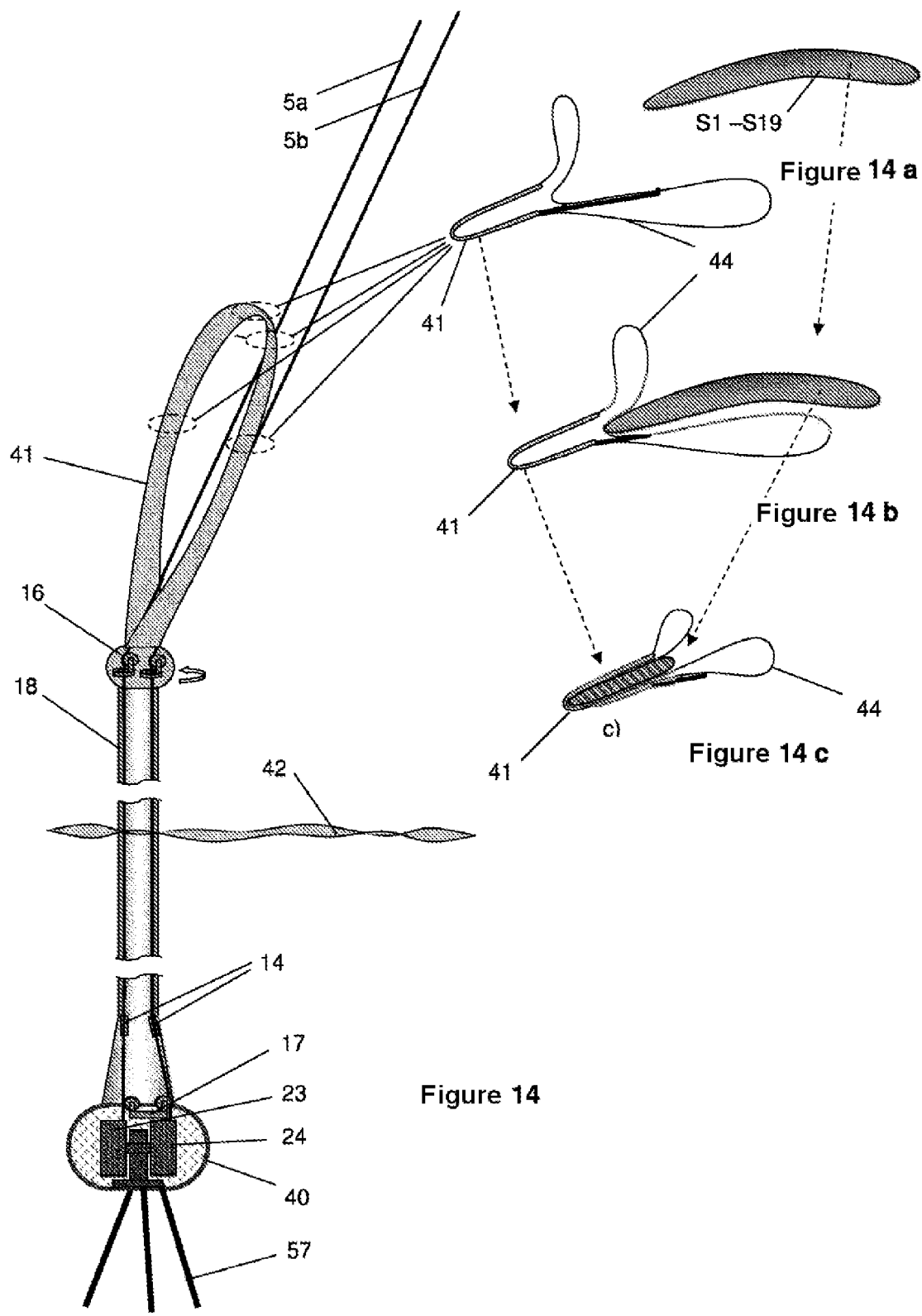
FIGS. 14a to 14c show various phases of hauling in the canopy

FIGS. 10 to 14c show various arrangements of base station 40 for offshore application with a buoyant or submersible base station 40, which is placed underwater so as to be storm-resistant (see FIG. 14). In this case, only a type of snorkel 18 projects out of the water.

Figure 12:
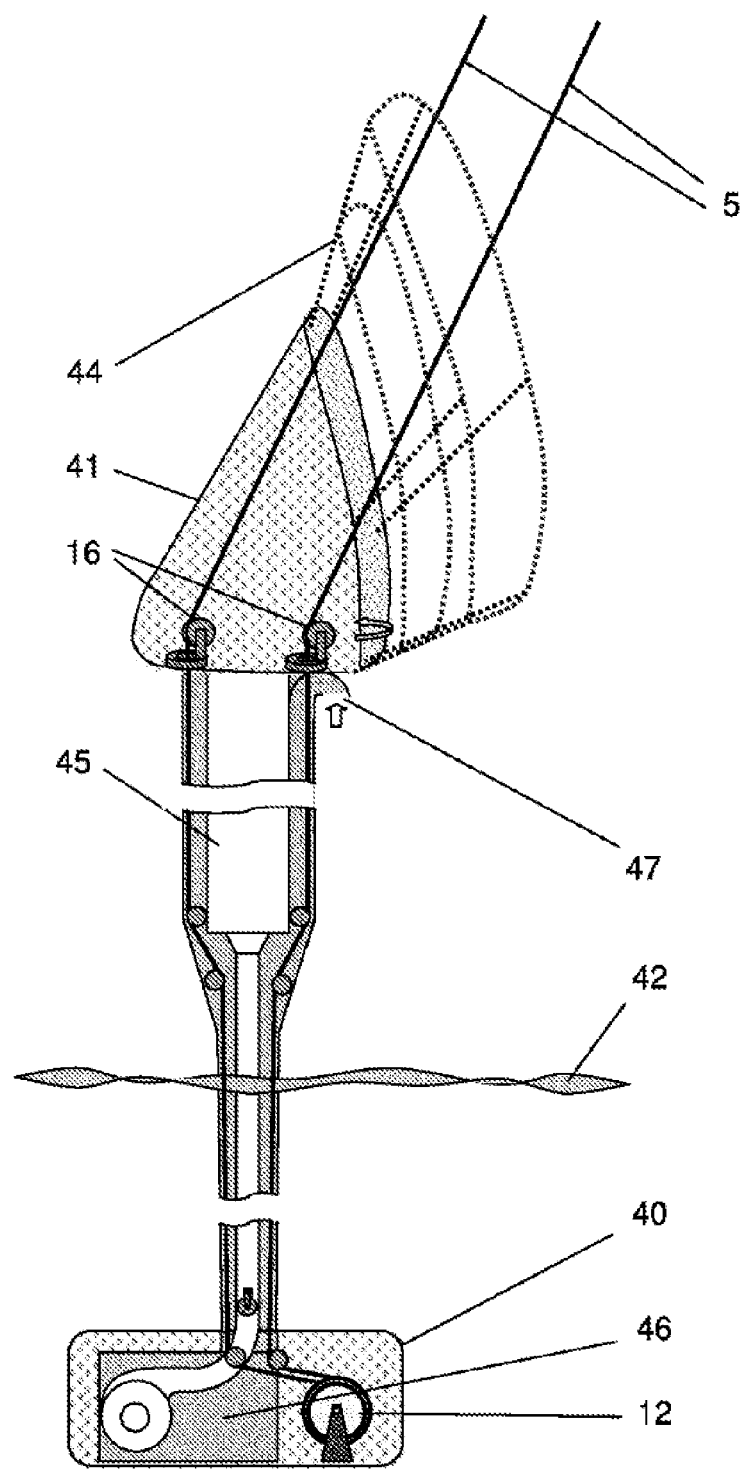
FIG. 12 shows, in a further embodiment, a base station for offshore application. A storage space 45 accommodates a canopy during a storm, while a blower unfolds the canopy for re-starting FIG. 13, like FIG. 12, shows a further arrangement of a base station for offshore application with rope drum in a side view. In the event of a storm, an oval U-profile device accommodates the canopy in itself in this case FIG. 14, like FIGS. 12 and 13, shows a further embodiment of preserving a canopy during a storm
Figure 13:
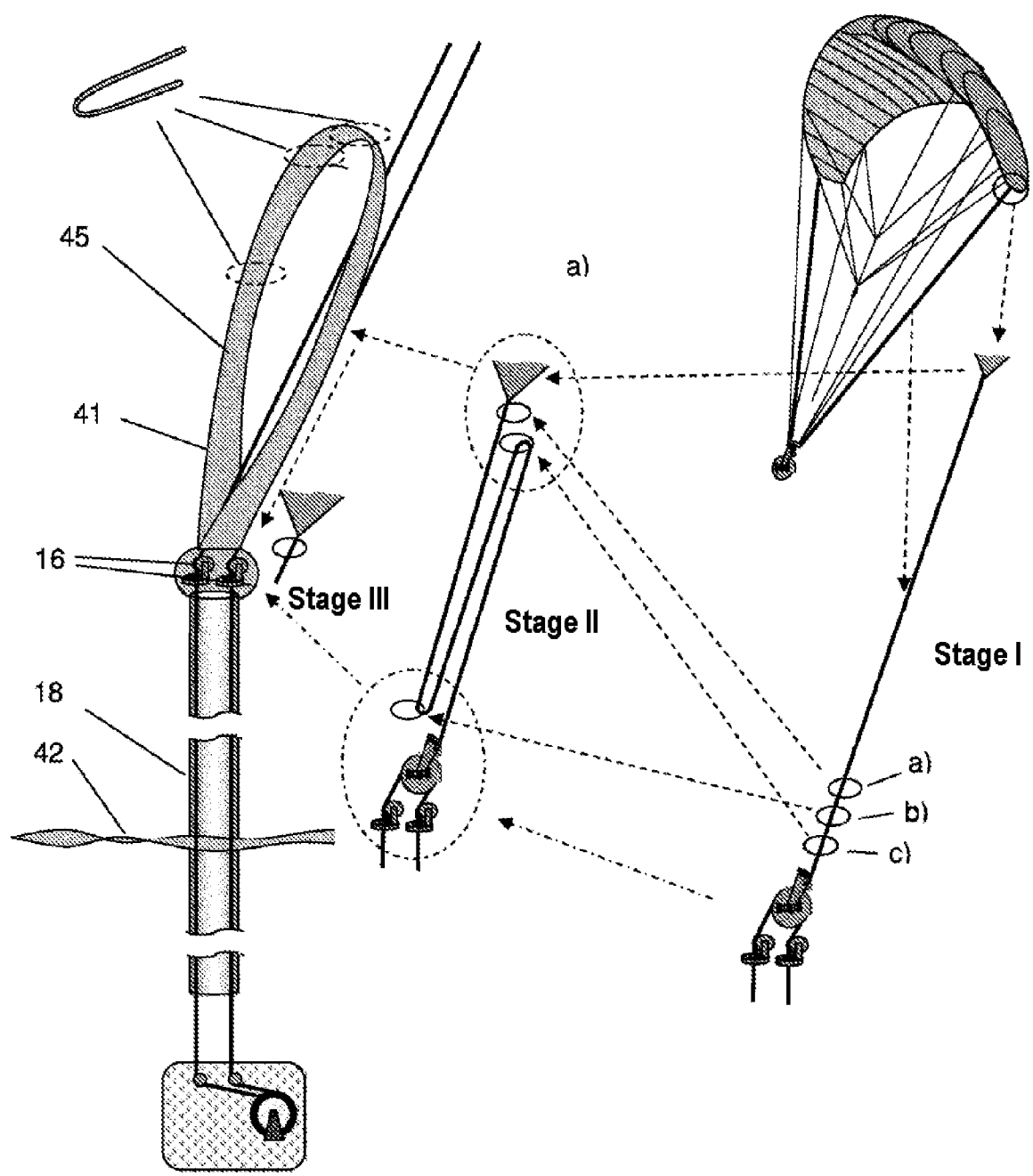

By means of deflection rollers 16, the two traction ropes are deflected independently of the wind direction. In FIGS. 10 and 12, the canopy during a storm is protected in a secure stowage space of the.

The base station accommodates the two rope drums 24 and is arranged below the water surface. This space is placed so deeply underwater that, in the event of a storm, the swell is largely above the base station.

The base station is fixed in a permanent location by means of an anchoring system 57 (see FIG. 14).

Figure 15:
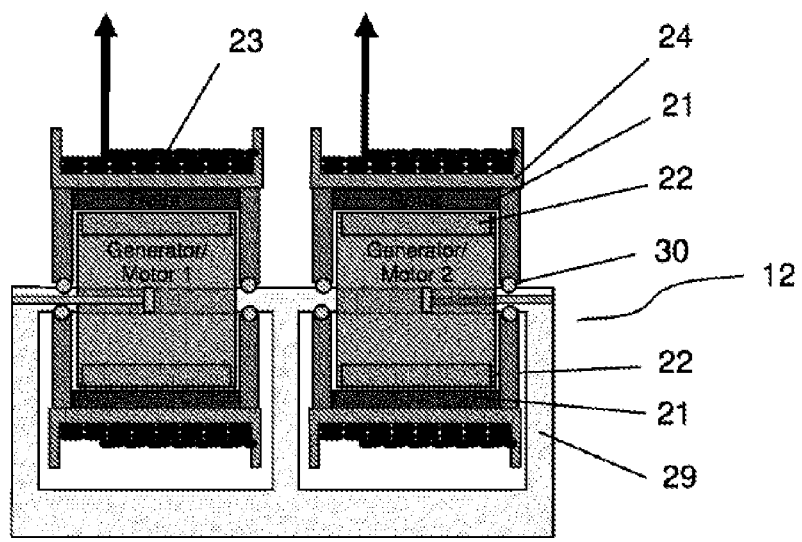
FIG. 15 shows a twofold rope winch with respectively separate generator/motor for each rope drum
Figure 16:
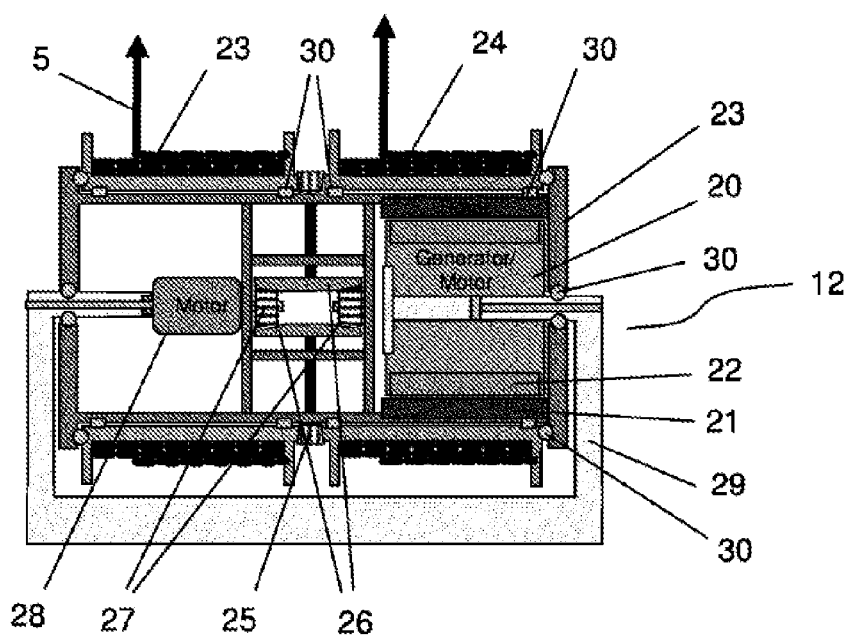
FIG. 16 shows an identical twofold rope drum with common generator/motor for both canopy traction ropes. A separate control motor 28 on a differential mechanism 25, 26 controls the difference of the two traction ropes 5a and 5b on the rope drums
Figure 17:
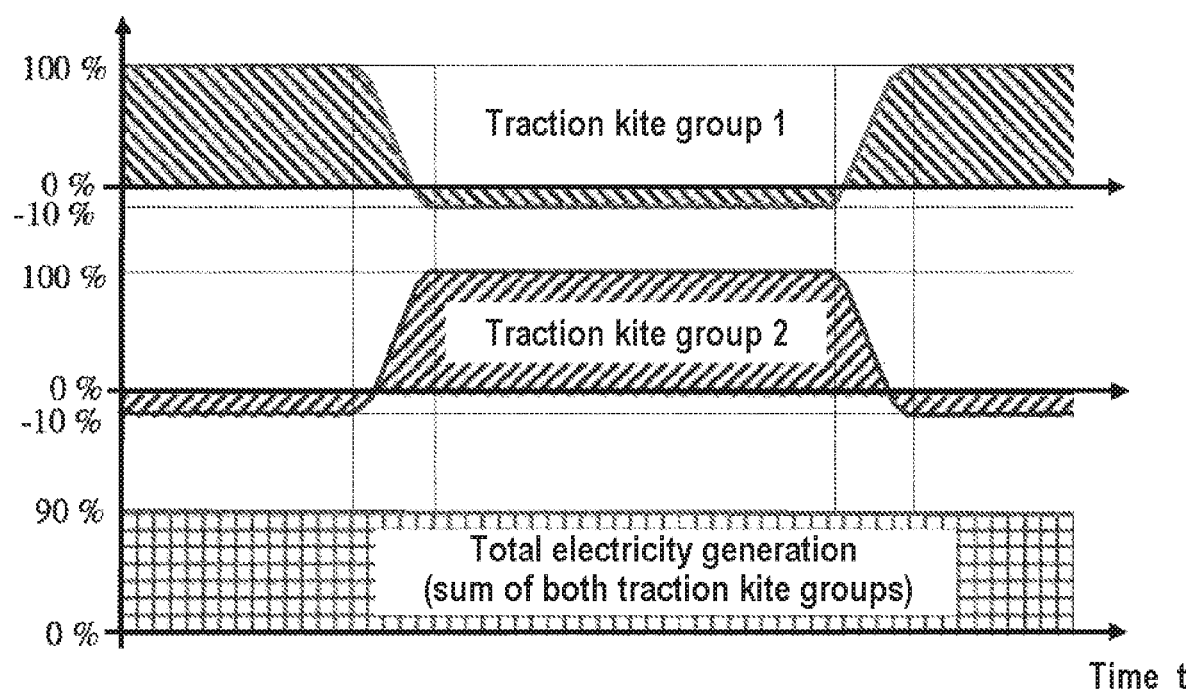
FIG. 17 shows the variation over time of the power taken up or given out by two traction kite groups operated in opposite directions, as well as the output ultimately given out overall

In FIGS. 15 and 16, the base station for accommodating two traction ropes 5 is respectively shown. FIG. 16 shows a base station which uses a common rope drum for both rope drums. By means of a differential mechanism, an adjusting motor can effect a relative change in length between the two traction ropes 5a and 5b.

Generating Electricity by Means of Vertical Windmills as an Alternative to Traction Kites In FIGS. 18 to 20, instead of traction kites, rotating fixed flyer wheels 50 are shown. Control of the position of a group of vertical windmills operates largely identically to the traction kites already described above.

By means of a deflection roller 6, the pulling force is distributed uniformly to the two traction ropes. Changing the relative length of the two traction ropes in relation to each other permits flyer wheel adjustment via the canopy control rope 2. The pulling force-dependent rope length stretch is also compensated for by the deflection roller 6 in this approach to the solution.

The traction rope deflection roller 6 and the transverse connection ropes 3 are arranged in a rotationally horizontally fixed manner.

The rotation of the flyer wheel is permitted by a rotary bearing 8 and a rope rotator 9.

A sensor fitted to the rotary bearing measures the angle of rotation of the flyer wheel and transmits this data to the base station.

These flying wind turbine systems also operate in two operating phases.

1st phase: Electricity generation (starting height, e.g. 200 m)

The group of windmills is set rotating by the wind and as a result pulled up high. As a result of the rotation of the flyer wheels, as in the case with classical windmills, the effective area for the lift is increased. In this case, the blades sweep through a large wind area 59 and generate a maximum of pulling force.

2nd phase: Hauling in the windmills (e.g. from a height of 500 m).

The angle of attack of the windmills is adjusted so that the flyer wheels change their direction of rotation and, in a steep descending flight with little pulling force, sink downward to the initial height. In the process, the diameter of the flyer wheels is also minimized by the blades being drawn in the direction of the centre of rotation (see FIG. 20). Once the descent has been completed, the angle of attack of the flyer wheels is reset again and the direction of rotation is changed back. The flyer wheels broaden out again (see FIG. 19, 18) and begin to generate electricity again as a result of paying-out and rising.

On the ground, as a result of pulling out the two traction ropes, in each case a generator for producing electricity is driven. A full cycle lasts for approximately 1-2 min.

The pulling force of the rotor blades is controllable by means of a relative adjustment of the length of the two traction ropes. Before the landing, the rotation of the flyer wheels is stopped and the blades are automatically brought into a predefined angular position with the aid of an angle sensor.

For the landing, the flyer wheels sit on a flyer wheel holder 70 and are held so as to be secured against storms. In order to re-start, these flyer wheels are released completely automatically from their holder 70 and are drawn up again by circular movements of the entire group (see FIG. 26).

Function of the Flyer Wheels

Each flyer wheel consists of three individual blades 50.

These blades can be designed to be very light, since, in a way similar to steerable kites, are held over their length at a plurality of points by retaining ropes 1 (54).

By means of blade positioning ropes 58 (as shown in FIGS. 18 and 21), the individual rotor blades are connected to one another and fixed. In each case three additional fixing ropes 59 are fixed at the centre of the blade and, in the extended state, ensure dimensional stability of the flyer wheel.

The holding ropes 58 of the individual blades are led over deflection rollers 61 and are connected to the control rope at the centre of rotation 60.

With the aid of the control rope 2, the effective area 59 and therefore the pulling force of the rotor blades can be varied. With a gentle wind, the three rotor blades are separated far from one another (see FIG. 18), so that they reach a maximum effective area. The control rope at the centre of rotation is relieved of load during the paying-out.

With increasing wind strength, the rotor blades are drawn closer to the centre of rotation by pulling in the control rope 2, so that the effective area of the rotor blades is reduced.

For this purpose, via the control rope 2 at the centre of rotation 60, the holding and fixing ropes 58 and 59 are pulled in. The fixing ropes 62 arranged crosswise maintain their original length.

The effective area of the rotor blades decreases, which means that the pulling force of the blades is also reduced.

As the wind strength increases further, the effective area of the rotor blades is finally minimized (see FIG. 20), which leads to a further reduction in the pulling force. In this position, a safe shape of the flyer wheel can be ensured even in the event of turbulence and high wind speeds.

If the canopy control rope 2 is pulled in still further, then, as shown in FIGS. 21, 22, the angle of attack of the blade can be eliminated completely, so the flyer wheel stops rotating. As a result, a further reduction in the pulling force takes place.

The angle of attack is adjusted by pulling in the control rope 2, as a result of which the control rope 51 is moved to the right (see FIGS. 21 and 22). As a result, the rope length of the traction rope 52 is shortened, which changes the angle of attack (see FIG. 22).

In normal rotary operation, an angle of attack $\alpha > 90°$ ensures rotation of the flyer wheel in the forward direction. Via the blade pulling rope 1, a major part of the pulling forces of the blade lift is dissipated. A positioning rope 52, which is also connected to the blade pulling rope, determines the angle of attack during normal operation (see FIG. 22).

With contact with the blade inner edges, by means of the control rope 2, 51, 52, a negative angle of attack of $\alpha < 90°$ is established, so that the blades begin to rotate backward.

During the landing phase, it is therefore possible, by means of pulling appropriately on the control rope, to readjust the rotational angle position of the flyer wheel as desired in relation to the holding device. An angle sensor placed on the rotary bearing 8 measures the rotational angle of the flyer wheel continuously for this purpose and reports this by radio to the base station.

Rotation-Dependent Adjustment of the Angle of Attack

In order to ensure that the flyer wheel 10 is located in the desired pulling direction of the traction ropes 5 during operation, a rotation-dependent adjustment of the blade angle of attack is performed, in a similar way to that in the control of helicopters.

This function is illustrated in FIG. 23. A tube 63 guides the pulling direction of the deflection roller via the attachment point of the traction kite connecting ropes 3. At its upper end, there are two rotary bearings 8. The three canopy traction ropes 1 (54) are fixed to the lower of the two rotary bearings 8, whereas on the upper rotary bearing 8 there is arranged a rod 53, which at its outer end, fixes the control rope 51 for the rotation-dependent adjustment of the angle of attack.

If the flyer wheel changes its pulling direction with respect to the tube 63, then the relative length of the canopy traction rope 1 with respect to the length of the control rope 51 is adjusted. This change in length is continued in a pulling movement of the control rope 51 and leads to a change in the length of the traction rope 52. Therefore, the angle of attack of the blade is adjusted as a function of rotation. Therefore, the pulling direction of the flyer wheel is stabilized with respect to the angle of the traction rope 1. As a result of the adjustment by means of traction ropes, a robust permanent function of the rotation dependent control of the angle of attack can be created.

Holding Device of the Flyer Wheels

The holding device is used for the protective preservation of a flyer wheel during a lack of wind, a thunderstorm or in the event of a system service.

Figure 28:
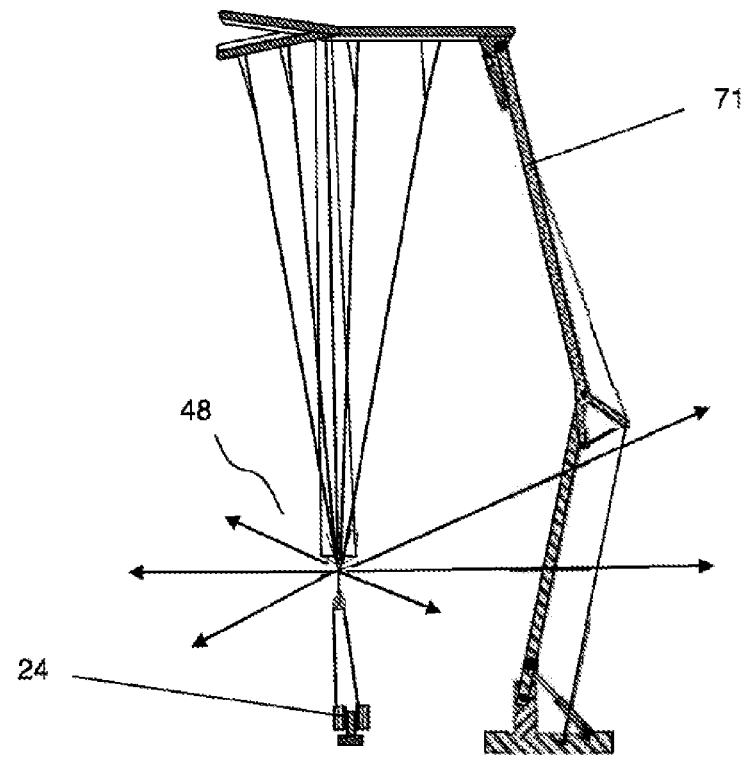
Figure 29:
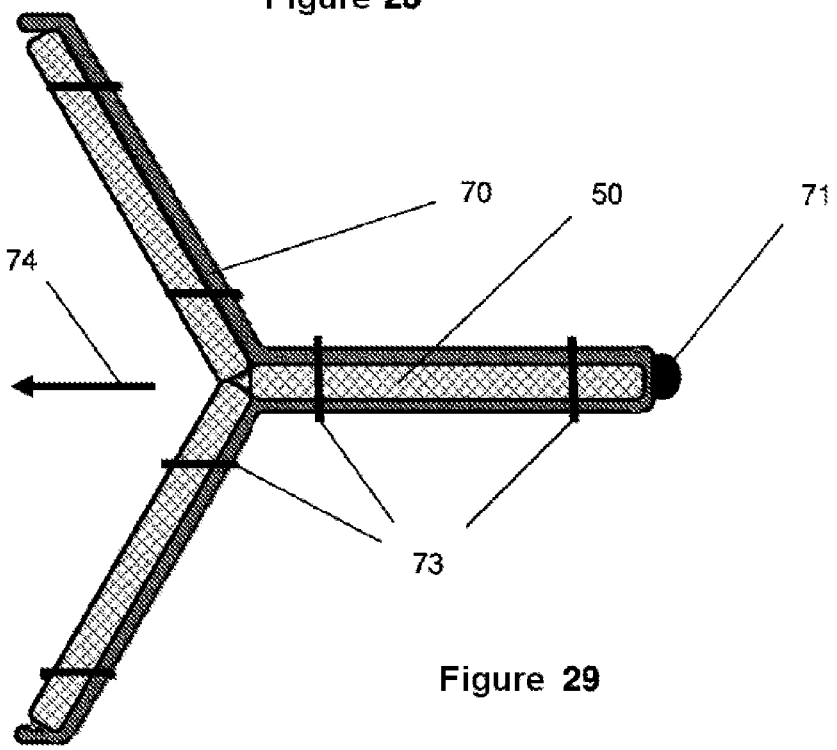
FIG. 29 shows the flyer wheel placed in the holding device in a plan view

As illustrated in FIGS. 27a and 27b, the canopy holder of the flyer wheel holder 70 has a possible vertical adjustment and is rotatably horizontally mounted. This landing device is designed in terms of its height such that the blade pulling ropes together with traction rope deflection roller 24 cannot reach as far as the rope drum 24 (see FIG. 28). For servicing purposes, this landing device is designed such that it can be folded in 72.

Directly after the landing, the blades are gathered by holding clips 73 so that safe provision against storms is ensured. The holding device is extended during starting and landing. Directly after the flyer wheel has been raised, the holding device is retracted.

Starting and Landing the Group of Flyer Wheels Hauling in the Flyer Wheels

Figure 30A:
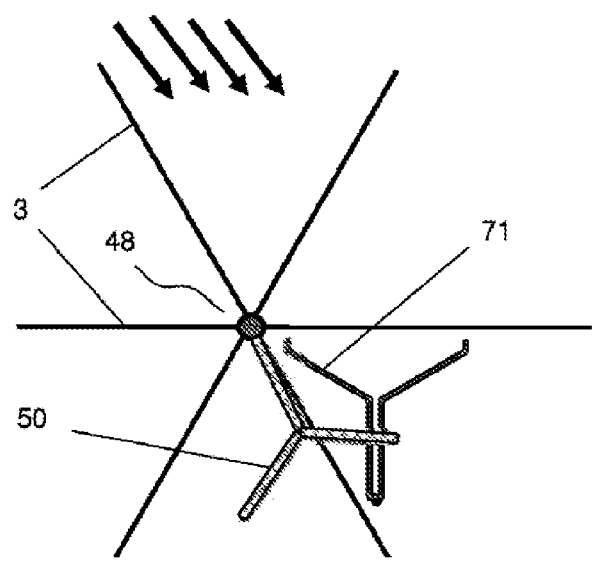
FIGS. 30a to 30c show, in a plan view, a flyer wheel as it is hauled in FIG. 30a shows the arrangement while the transverse connecting ropes are still located above the holding device In FIG. 30b, the transverse connecting ropes are already underneath the holding device In FIG. 30b, the flyer wheel has finally been placed in the holding device

During the landing operation, the flyer wheel holder 70 is extended and positioned horizontally such that none of its outer edges touches the transverse connecting ropes (see FIG. 30a). The transverse connecting ropes 3 are driven by means of the rope drums 13 such that the two traction ropes 5 of the flyer wheel 70 slide along close to the left-hand outer edge.

Figure 30B:
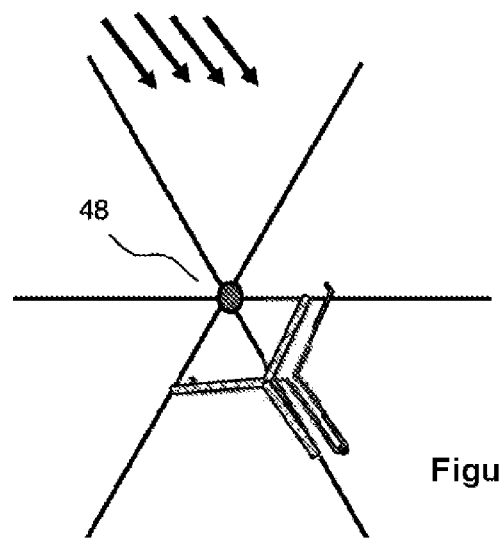

As soon as the transverse connecting ropes have reached underneath the flyer wheel holder 70, the latter is rotated (see FIG. 30b). At the same time, the profile angle of attack $\alpha$ of the flyer wheel 50 is driven in such a way that the angle of rotation of the blades is aligned exactly so as to fit the flyer wheel holder 50.

Then, the transverse connecting ropes 3 are driven by means of the rope drums 13 such that the two traction ropes 5 of the flyer wheel 50 are positioned underneath the flyer wheel holder.

The blade pulling ropes 1 are therefore automatically located within the flyer wheel holder.

Figure 30C:
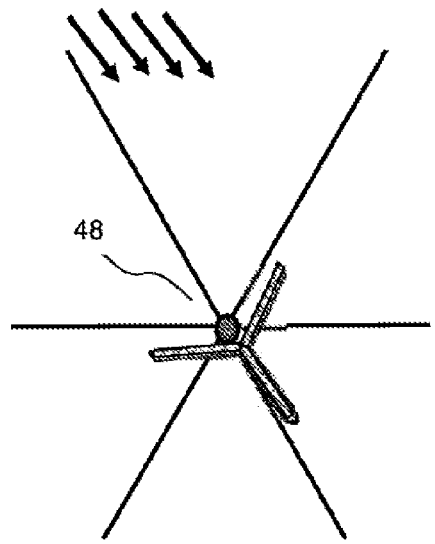

The flyer wheel is then located in the form of the flyer wheel holder 71, as in FIG. 30c. The holding clip 73 is extended and clamps around the flyer wheel 50.

The flyer wheel holder is retracted (see FIG. 27b). The flyer wheel has then reached the ground in a manner protected against storms.

All the flyer wheels are retracted simultaneously.

Re-Starting the Flyer Wheels

Figure 31A:
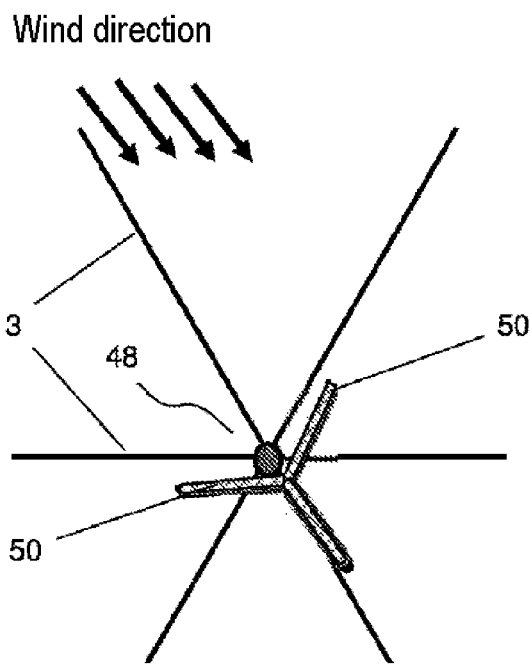
FIGS. 31a to 31c show, in a plan view, said flyer wheel shown in FIG. 30 during the starting operation In FIG. 31a, the flyer wheel is still in the holding device and is held firmly there In FIG. 31b, the transverse connecting rope is moved to counter the wind direction with the aid of the outer rope drums in such a way that the traction ropes of the blades are braced FIG. 31c the holding clamps are released, so that the flyer wheel is drawn laterally out of the holding device and begins to rise
Figure 31B:
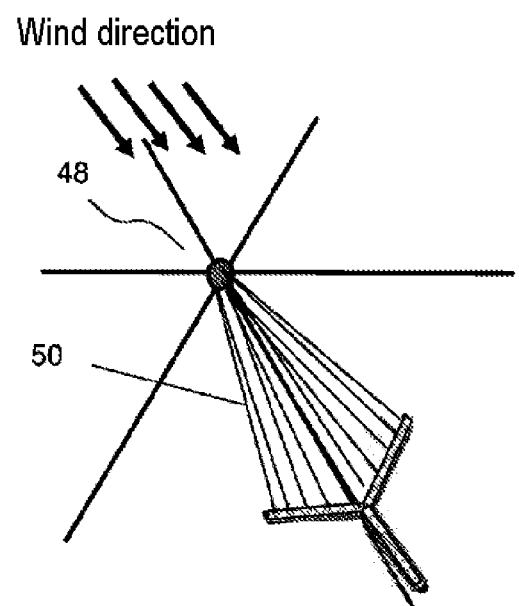

The re-starting of the group of flyer wheels (see FIGS. 31a to 31c) is carried out with the aid of the transverse connecting ropes 3. To this end, the rope drums 13 of the lateral transverse connecting ropes 4 form a braced grid network. This grid network moves toward the current wind direction. The holding clips 73 still clamp around the flyer wheels 50, so that the blade pulling ropes 1 begin to tension.

Figure 31C:
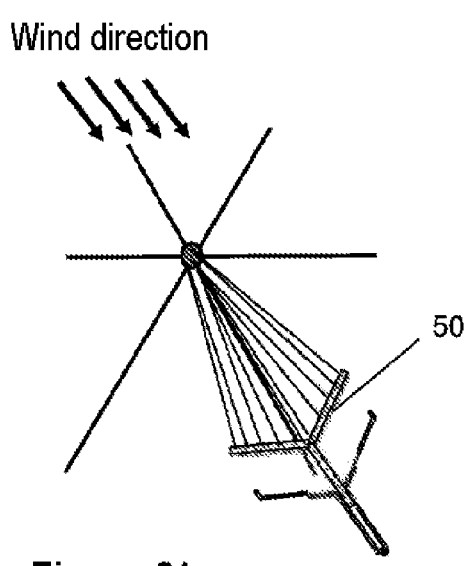

Once the tension has built up, the holding clips 73 on all the flyer wheels 50 open simultaneously and release the same (see FIG. 31c).

The grid network accelerates its horizontal movement against the wind.

The flyer wheels are drawn quickly away from the flyer wheel holder 70 and begin to rise. The flyer wheel holders 71 are retracted quickly 72, and therefore the transverse connecting ropes 3 are not caught therein.

By means of the positioning ropes, as shown in FIG. 26, the group of flyer wheels is then moved circularly, so that the flyer wheels are pulled higher and higher.

The transverse connecting ropes 3 (grid network) move circularly but in a rotationally fixed manner in the process.

Overload Protection

Figure 32:
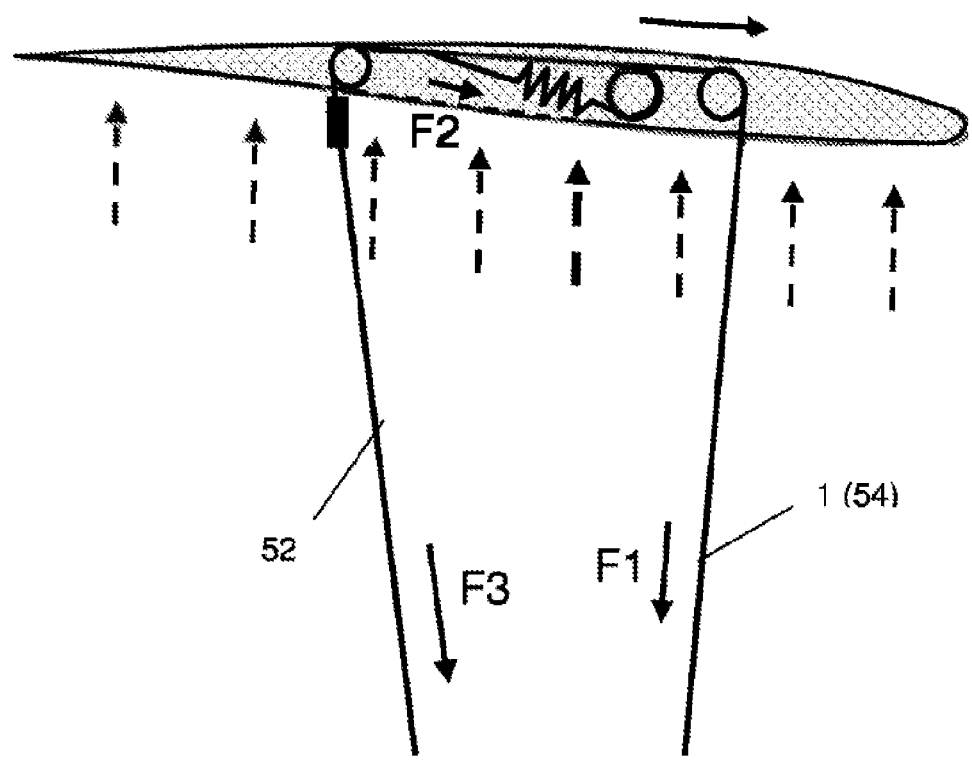
FIG. 32 shows the function of an overload protector in a sectional illustration of the blade
Figure 33:
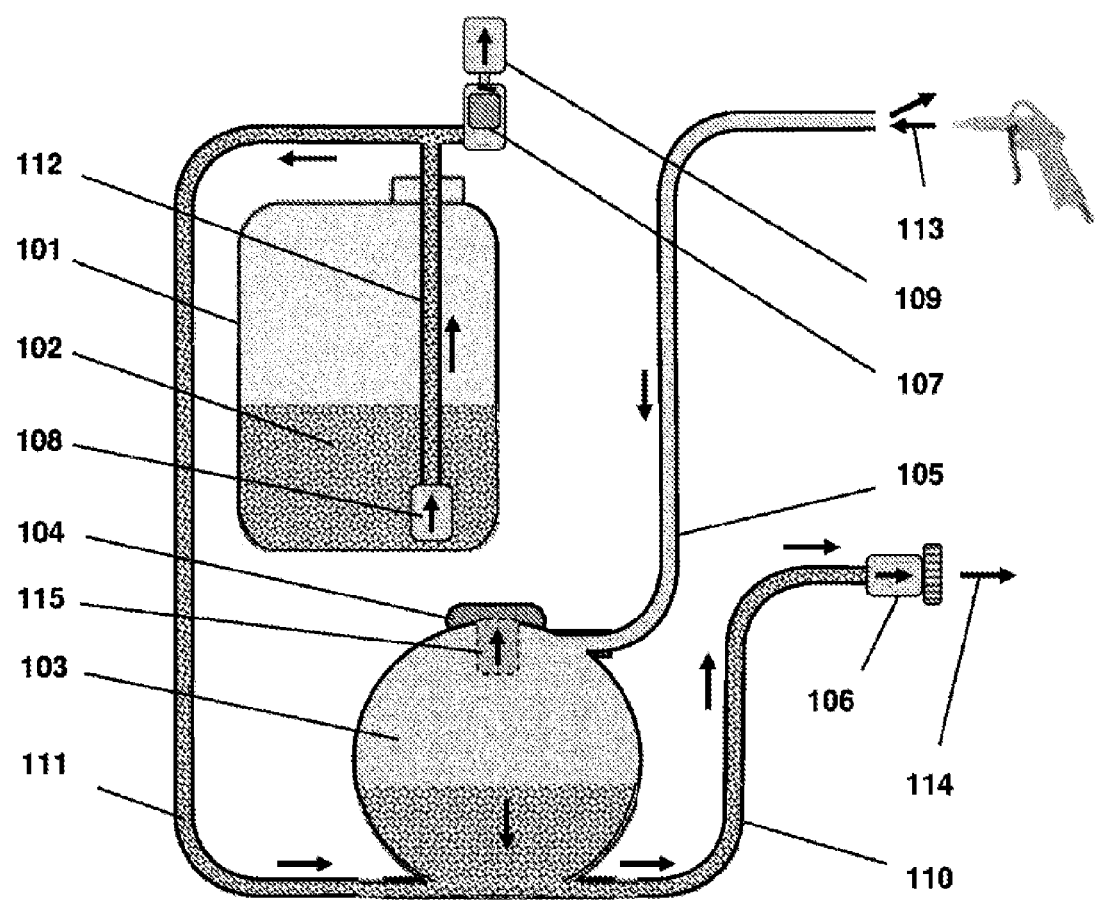
FIG. 33 shows a device for refilling a thermal solar system

In order to optimize the weight and costs of the traction ropes and the blades, a limitation of the pulling force in the blades is fitted. The blade pulling rope 1 enters the blade in the front region, as shown in FIG. 32, is led over two deflection rollers and then led out again on the right-hand side of the blade profile (see FIG. 32). A spring in the interior of the blade pulls the rope 52 upward against a stop. The total force of the wind on the blade lies more on the blade pulling rope side 1, so that a force acts on the tension spring. In the event of a sharp squall, the force F3 exceeds the total of the two forces F1+F2, which leads to stretching of the spring and raising of the left-hand blade side. Therefore, relieving the load on the blade and the pulling forces on the traction rope 1 is achieved.

Refilling Device

In order to fill or refill a solar system with solar liquid, there exist several filling methods. Thus, pumps are offered, which, driven by a drill, operate on the principle of a gear wheel. The pressure achieved by such devices is generally not sufficient because of excessively high leakage.

Furthermore, there are hand pumps which suck in the solar liquid from an open container and press it into the solar system. A higher price and the complicated filling and emptying of the basin, and also the venting of the connecting hose are complicated, however. Filling proceeds very slowly.

The device described here uses the circumstance of pressing the solar liquid out of the pressure vessel 103 into the solar system 114 with the aid of compressed air. Such pressure vessels are used as radiator compensating containers in every automobile and are therefore an inexpensive bought-in part.

At the start of the filling operation of the solar system, the pressure vessel 103 is filled once with solar liquid out of the canister 101. After the pressure vessel has been closed, the filling hose is connected to the solar system. Compressed air, preferably from a compressed air gun belonging to a compressed air compressor, is then pumped into the pressure vessel via the compressed air connecting hose. The solar liquid is forced firstly into the refilling hose 111, while the air in the refilling hose escapes via an automatic vent. A reverse-flow preventer 108 prevents solar liquid here from being able to flow from the pressure vessel 103 into the canister. After the refilling hose has been filled completely with solar liquid, the filling of the solar system via the filling hose 110 begins after the pressure has exceeded 150 mbar.

Shortly before the pressure vessel 103 is completely emptied, the compressed air connection is opened and the air is let off out of the pressure vessel. A reverse-flow preventer 106 prevents liquid from being able to flow out of the solar system again. Solar liquid is then sucked out of the canister 101, which is placed somewhat higher, and is led into the pressure vessel lying somewhat lower. Shortly before the latter has been filled completely, compressed air is introduced from the compressed air gun at the compressed air hose and, as a result, fills the solar system with solar liquid again. This sequence, by alternately filling with compressed air and letting the latter off, is repeated until the solar system has been filled completely.

Special features of the refilling device:
Simple and therefore reliable functioning
No inadvertent escape of solar liquid following reduction→both hose ends (filling hose and refilling hose) are secured against escape by means of reverse-flow preventers
Suction of the solar liquid directly out of the canister
Economical production, since pressure vessels are installed in large numbers in every automobile
Simple emptying of the filling device by means of sticking the filling hose into the canister (no loss of liquid when unscrewing because of reverse-flow preventer), then inserting the compressed air hose into the canister and holding the other hose ends up high
Production of compressed air as a rule of an existing compressed air compressor —possibly also by means of bicycle foot pump.

Energy Store on the Seafloor by Means of Using the Water Pressure

For the further expansion of alternative energy carriers, the storage of the energy is of great importance. There are already possibilities today of generating electricity even in deep waters in the seas with the aid of wind force. According to one study, nine of the ten largest megacities are located close to the sea. In 30 years, three of four people will live on the sea or in areas close to the coast. Here, the water depth of the sea on most coasts is already deeper than 1000 m at a distance of about 30 km. There is thus the possibility of performing both the generation and the storage of the alternatively generated energy in the sea, so that the supply of these conurbations with the amount of energy respectively needed can be carried out in a simple way in front of the coasts of the conurbations.

Features and Advantages
Excellent environmental compatibility, since there is no impairment to the environment as compared with classical pumped-storage plants
Capable of construction in any desired numbers, since there is sufficient space on the seafloor
High energy density of the system as a result of a high water pressure
Short creation time, since (once developed) mass production is made possible
The shape, similar to the known Frisbee, permits a system that is many times larger as compared with spherical stores, given the same wall thickness
High acceptance in the population, since invisible if placed on the seafloor
Store is buoyant when completely empty and can therefore surface in a simple way at any time in the event of service or repair
Simple service and repair of system parts
Simple transport from production site to the desired place of use
Pump turbines for water depths up to 1000 possible
Simple production of the individual honeycomb cylinders by using prefabricated modules and prefabricated shell construction
First turbine compressor stage with larger volume, consequently pumpable even with a low absolute pressure or vacuum
Low potential hazard, since the store is placed at a great depth
Production directly in the water—therefore no expensive dry dock which possibly restricts the store size is needed
Series and therefore logical production at coasts (high efficiency as compared with individual and frequently difficult-to-access building sites of previous pumped-storage plants)
Extremely short line guidance, as a result excellent dynamic response as a result of low mass moment of inertia of the water in the feed lines
Location of the store in the vicinity of use is possible (e.g. ≤30 km off the coast of megacenters)
39% of humanity lives less than 100 km away from the coast (20% less than 30 km)
frequently, deep water ≥1000 m) is already found 30 km off the coast
No plant feet and, as a result, capable of surfacing (closed space on the store underside with film on the sea floor for uniformly distributed buoyancy force in accordance with a hydraulic principle; store filling weight about 460,000 tonnes!)
Low positive pressure between store and sea floor (1.6 bar at 20 m storage space height)

Low inherent store weight (comparison with sea-egg)
Internal walls support only vertical forces
Bottom and top plate support horizontal forces For the further expansion of alternative energy generation, it is of great importance to provide energy stores with high storage capacity.

Hitherto, pumped-storage plants have usually been used for this purpose. The total storage capacity of all pumped-storage plants in Germany is about 40 GWh. In order to extend the renewal energy (solar energy and wind force) further, however, a multiple of this storage capacity that is at present available is needed.

A considerable further expansion of classic pumped stores is not possible in Germany.

As a result of a great demand with regard to further expansion of wind force, according to studies the worldwide market for pumped-storage power plants will grow in the next ten years as never before. Until 2020, over 100 new plants with an installed output of around 74 GW will be produced.

On the other hand, it transpires that the plurality of all the worldwide conurbations or megacities are located close to the sea. The use of the sea as a location or medium for the storage of electrically generated energy is thus recommended. Furthermore, in the meantime there is also the possibility of generating electrical energy from wind force even in deep waters at sea, for example in the form of traction kites or floating structures of windmills.

Supplementary storage of wind energy is recommended as an ideal solution for supplying urban centers close to the sea, so that the respectively currently needed demand for energy can be drawn directly from the sea by means of undersea power supply cables.

Geographic marine charts show that, apart from a few exceptions, most continents already have deeper waters of 1000 m water depth and more relatively close.

In the application described here, it is therefore proposed to use the water pressure prevailing at great depths in the sea in order to store overcapacity in times of the latter.

This is done by a hollow space which is stable enough to withstand the enormous water pressure being created at a great water depth. This store is composed, for example, of high-strength concrete. At the water surface, this store has a specific weight when empty which is somewhat lower than that of seawater. In this way, the storage container, already flooded with a low amount of water, can sink as far as the seabed (in, for example, from 700 to 2000 m water depth).

This store has an appropriately dimensioned turbine, which is coupled to a generator. For reasons of redundancy, it is recommended to place 2 to 3 such pump turbines in a manner distributed in a system.

The generator/motor of this store is connected to a control center via an undersea power supply cable.

Functional Description of the Marine Store

In the event of a necessary power demand, seawater can flow into the empty internal spaces of the store. As a result of the high water pressure of, for example, 100 bar (at 1000 m water depth), a great amount of electrical energy can thus be generated. If the store is filled with seawater, then in the event of overcapacity in, for example, generated wind energy, this seawater can be pumped out of the store again with the aid of high-pressure pumps. The high water pressure in turn makes it possible for a large quantity of electrical energy to be stored in the process. Here, the efficiency of 80% to 85% known from pumped-storage plants can be achieved. Operation of this system at 1000 m water depth corresponds here to a pumped-storage plant with a gradient of 1000 m between upper and lower basins.

The placing of the energy store on the seabed permits any desired large number of energy stores to be used, so that, as opposed to energy storage on land, here there are no space bottlenecks and thus a correspondingly needed total plant size can always be placed.

In principle, for the use of high pressure-resistant hollow spaces as needed here, the use of a spherical configuration is obvious. Therefore, such configurations are also already known as pre-publications.

Consequently, there is a particular requirement in the choice of the with regard to shape, economical production and possible plant size.

As opposed to a spherical configuration, in the invention described here a circular flat form is proposed, as is known from Frisbees. This has the advantage that, in relation to a spherical configuration having a similarly thick outer wall, a multiple possible storage volume can be achieved. In a side illustration (see FIG. 34), such a configuration is made clear, this having a circular or eight-sided form in plan view (see FIGS. 35 and 36).

Figure 34:
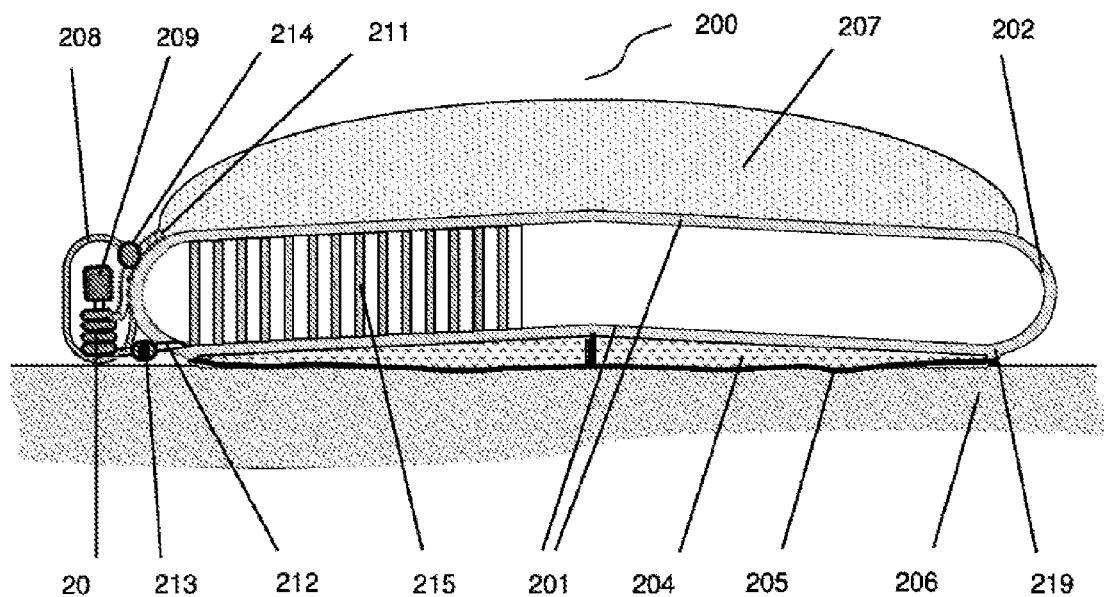
FIG. 34 shows, in a side view, a frisbiform marine store having a water cushion as contact surface with respect to the seafloor
Figure 35:
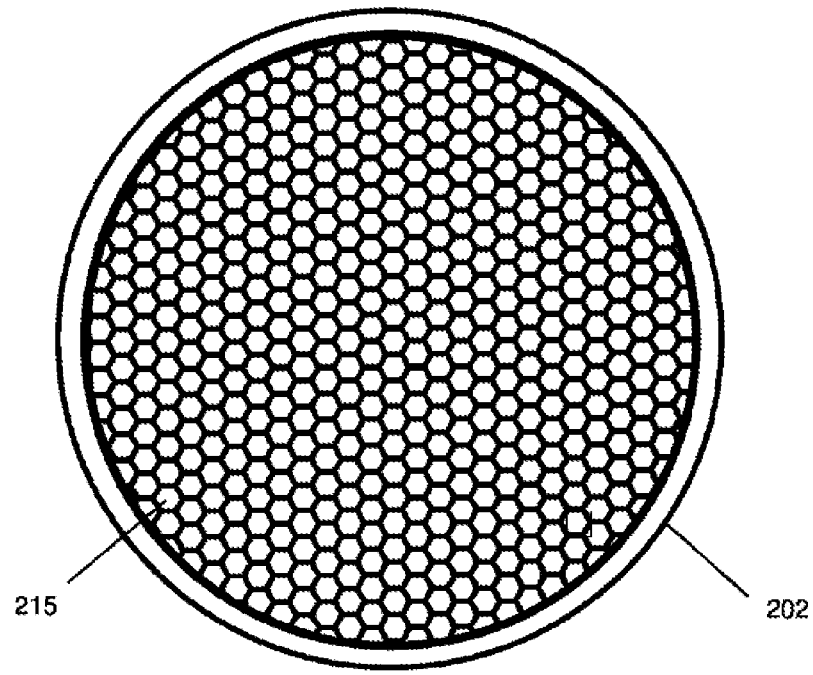
FIG. 35 shows, in a section in a plan view, the marine store with its honeycomb chambers and round outer shape

With a Frisbee-like shape as illustrated in FIGS. 35 and 36, as compared with a spherical design, 50 times the storage volume can be created with an identical wall thickness. In the system example illustrated by means of FIG. 34, a height of 25 m is assumed with an overall diameter of 150 m shown here.

In this example, given 1000 m water depth, a thickness of the outer wall of about 2.5 m is needed. In comparison therewith, the thickness of the outer hull that is needed for a spherical container is likewise to be provided at 2.5 m.

Pressure Resistance

The static pressure loading of the pressure store in the form of a Frisbee can be divided up into two calculation sections, as in FIG. 38. While the outer ring 202, which is circular and semicircular in its lateral section, determines the thickness of the upper and lower container top 201 with the forces F2, F3, the honeycomb chambers 215 that can be seen in plan view (see FIGS. 36, 37) are calculated from the compressive forces F1 which act vertically and which act on the container top and bottom 201.

It is therefore possible to achieve a substantially greater storage volume with the same dimensioning of the outer wall thicknesses.

Using the example of the volume comparisons of a spherical store with an external diameter of 25 m with a Frisbee-like store of same overall height and therefore the same thickness of outer walls, the result with a diameter of 200 m is storage volume that is greater by the factor 50.

The configuration of the storage container chosen in FIG. 36 shows, by way of example, three machine rooms 208 with respective pump turbines. These machine rooms can be fitted at the side, as illustrated in FIG. 34. In FIG. 36, 39, 40, the machine rooms are integrated in the storage space. The components placed in the machine room 208 can be withdrawn piece by piece out of the storage container in the manner of modules in the event of repair or service and replaced if necessary.

As a result of the possibility of surfacing, there results a further simple possibility of maintaining all the installed machine parts and components, it being possible for the energy store to assume any desired position as it surfaces (horizontal, horizontal upside down or upright in the water).

Navigation

With the aid of water-jet nozzles 217 in the physical vicinity of a respective pump turbine 210, the entire store can be moved and navigated during surfacing or submersion. With the aid of ball valves 218, the seawater taken in by the pump turbines can be diverted to the water-jet nozzles. Therefore, a high drive output from all three pump turbines of, for example, 240 MW (system with 1 GWh) is available for navigation.

Structure of the Store

The store shown in FIGS. 35 and 36 is composed of about 1200 honeycomb modules (see FIG. 37). These buoyant individual modules (dimensions ⅜m×20 m), with about 28 cm wall thickness, are assembled from four individual parts respectively.

Using the example of FIG. 36, the following features of a store for 1000 m water depth result:

Diameter 215 m, height 25 m (depending on external dimension)

Outer wall thickness (bottom, top, half-round side edge) each 2.5 m thick

Each individual honeycomb module is composed of 3 side walls each made of pre-cast concrete (2 parts), a bottom and top made of pre-cast concrete (2 parts).

All the honeycomb modules have lateral openings, at least on their underside, so that the water can flow to the outside or inside through all the internal modules during the filling or emptying.

The pump turbines can be removed upward and likewise placed in a honeycomb installation space of the store. The peripheral semicircular outer walls 202 serve as a collecting channel (feed to pump turbines).

In order to forestall any risk of contaminating the internal spaces in the store during operation, the water pumped out of the store can be stored 207 by means of a film fitted directly above the store. As a result, it is possible to ensure that, during the subsequent refilling of the store, the same water is reused and this water does not have to be filtered again.

As a result of the possibility of creating large storage volumes, a comparatively high inherent weight arises, so that even with large-area contact on the sea floor, when filled with seawater very high contact forces are produced. In the example case of an overall height of 25 m, forces of about 16 tonnes per m$^2$ thus arise when filled, even with large-area contact. Therefore, a solution using individual standing legs is not feasible. By using water cushions 204, which are placed on the underside of the store, it is possible that, despite any unevenness of the sea floor, a uniform distribution of the contact forces of the inherent store weight is achieved. As a result, additional bending stresses of the store can be avoided, so that its design is reduced exclusively to the pressure stresses as a result of the water pressure.

Store Mounting and Leveling

As a result of its flat design, the store has a very large contact area with respect to the sea floor. As a result of the high weight of the water in the store when filled, an equalized distribution of weight is of great importance (store filling weight about 460,000 tonnes with a storage size of 1 GWh).

A film that is watertight and reinforced with steel wires at the surface of the sea forms a closed space. Since the film occupies the entire area underneath the store, a relative positive pressure of only 1.6 bar is produced when the store is filled.

Figure 39:
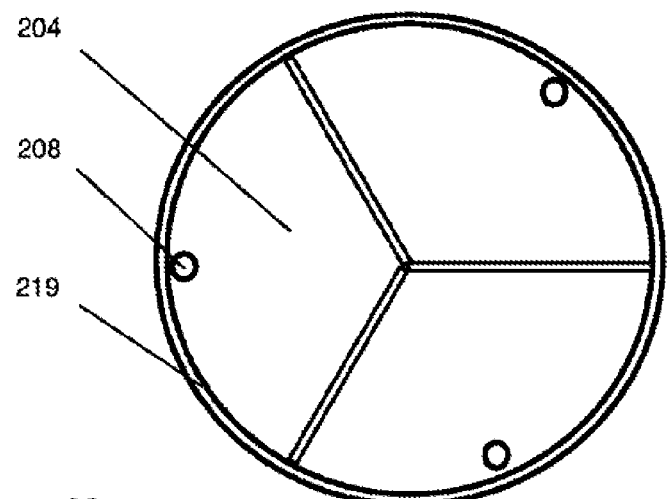
FIG. 39 shows, in a view from below, the three respectively separate water cushions for supporting and leveling the store
Figure 40:
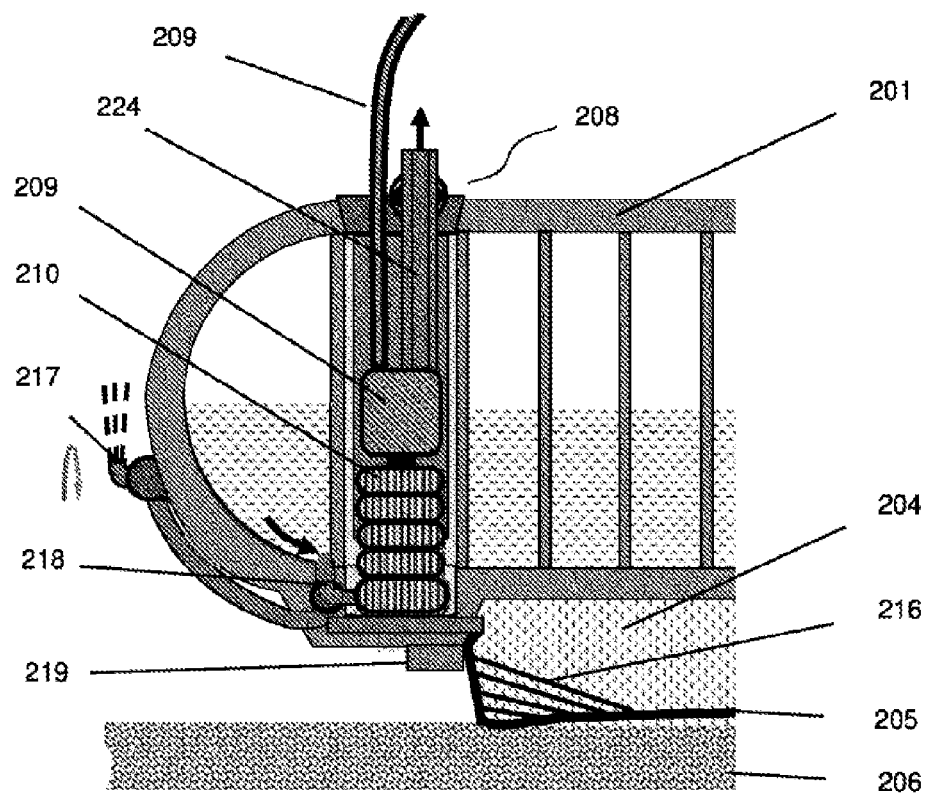
FIG. 40 shows, in a side view, a store in the area of the machine room, comprising motor/generator, pump turbine and ball valve for changeover

The contact cushion is divided up into 3 areas, as shown in FIG. 39. Each of these 3 cushions can be filled by a pump turbine located in the physical vicinity and therefore leveled.

With this threefold division, it is possible, in addition to the task of supporting the weight, even to achieve leveling of the pump store with respect to a base which is, for example, slightly inclined. In normal operation, the 3 store cushions are shut off so as to be watertight and therefore effect a type of 3-leg support. In the virtually empty state of the store, there is no positive pressure in the leveling cushions.

Creating the System by Means of Finished Honeycomb Modules

As a result of the comparatively flat shape of the Frisbee-like storage container (25 m height with, for example, 150-200 m diameter), the store can also be created directly at the coast in comparatively flat water. By means of the use of finished modules which are joined together in the water, the base can be created by joining all the individual honeycomb modules to one another. The upper top plate 201 and the circular radial side walls 202 with a wall thickness (e.g. 2.5 m) are concreted onto the upper side of the honeycomb modules.

After that, the already tight store can be moved into deeper water and turned over. As a result, it is then possible to create the lower thick base plate together with the lower outer fixtures. Finally, the turbines with pump and drive 208 can be installed and set up ready for operation. In this way, economical creation of even relatively large energy stores becomes possible without the use of expensive dry docks. Following fabrication, the stores created in this way can be transported worldwide to any desired location of use by means of tugs and put into operation there.

Creating the System by Means of 3-D Plotters

Instead of the use of individual honeycomb modules which are connected to one another and are enclosed by an outer solid concrete sleeve, the entire storage container can also be printed by means of special 3-D plotters.

This technology is currently being developed ready for mass production and will already be available for mass production in a few months.

In order to increase the efficiency and stability of the store, it is proposed to take a new path to implementation in some points.

The 3-D Plotter Creates Only Shuttering

The 3-D plotter creates only a type of false work but not all of the walls and cover. The concrete selected for use is put into this created "formwork". In the case of a store subjected to high pressure, high-strength concrete with a possibly long setting time is used. Only the immediate outer walls are plotted continuously. Within one wall or cover, only a type of grid-like structure is plotted. This treatment firstly increases the plotting speed considerably and at the same time, forms a continuously connected configuration for the concrete, which is high-strength here.

The 3-D plotter thus has two print heads. The actual plotting nozzle and a further larger nozzle for filling the interspaces with the construction material actually selected—here high-strength concrete.

A second arm which, for example in the area of the covers and walls, holds small fabrication elements (platelets) at the respective plotting point, can be added to the plotter. The 3-D plotter prints on these platelets and connects these with the already existing cover.

If plotting is not carried out horizontally, as was previously usual, but under a slight angle of, for example, 30°, then a self-supporting cover can be created in the piece and without additional aids or supporting elements.

Positioning of the 3-D Plotter

The previously known 3-D plotters are usually fixed to carriers, which permit a movement in the X, Y and Z direction along rails. As a result, simple determination of position and therefore the information where the plotter is to perform the application of the material results. One disadvantage of this procedure exists in the case of large objects to be created, such as, for example, in the case of the above-mentioned store. Here, rail systems are obstructive or have a large physical extent, which makes fast and precise working more difficult.

Figure 43:
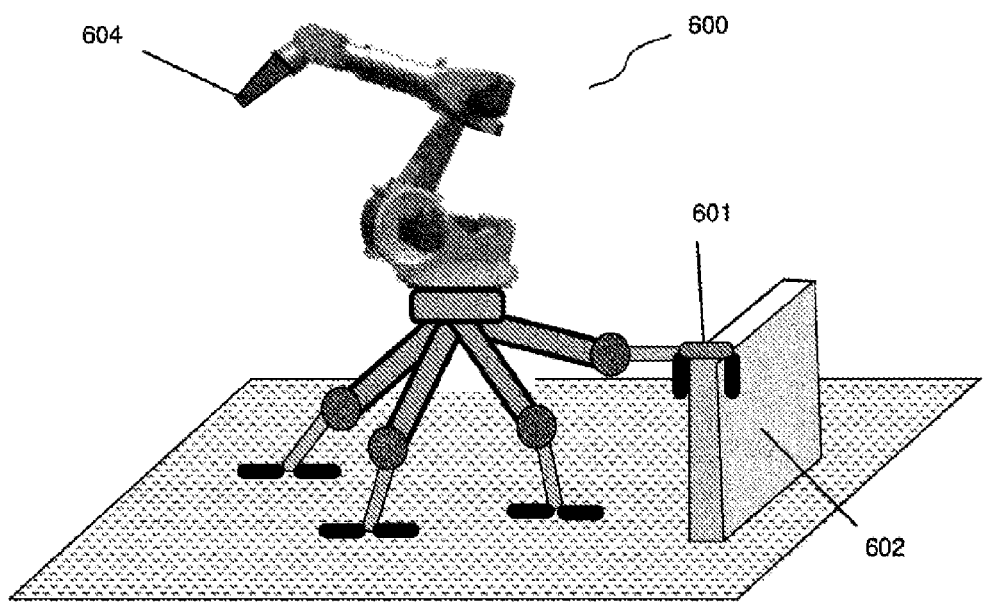
FIG. 43 shows an industrial robot with 3-D print head and movable feet FIG. 44, finally, shows a rail along which a plurality of said robots can move. This rail is supported and positioned at its respective end by robot arms equipped with grippers.

It is therefore proposed, instead of rails, to use a movable robot, as shown in FIG. 43. Such robots have already been used many times in industry for decades and, despite their rotatably mounted arms, can execute linear movements precisely without difficulty. As shown in FIG. 43, this robot is not anchored firmly but can move with the aid of multiple movable legs. These legs can be supported against a horizontal base but can also be held firmly on vertical walls by means of tongs-like grippers (See FIGS. 43, 44). It is therefore possible for the robot to move on and fix to the building to be created. This is made easier by the fact that, in the central control computer, the exact status of the building to be created is known. The robot knows the surroundings and also the status of the load-bearing ceilings, floors and walls.

After each change of its position, the robot must first determine its new position accurately. For this purpose, stationary position markings are placed on the outer edges of the construction site. The position detection is possible by means of a laser measuring system; this re-orientation can be assisted by cameras. Then, the robot or the robots can continue their work again, taking the new position into account.

Figure 44:
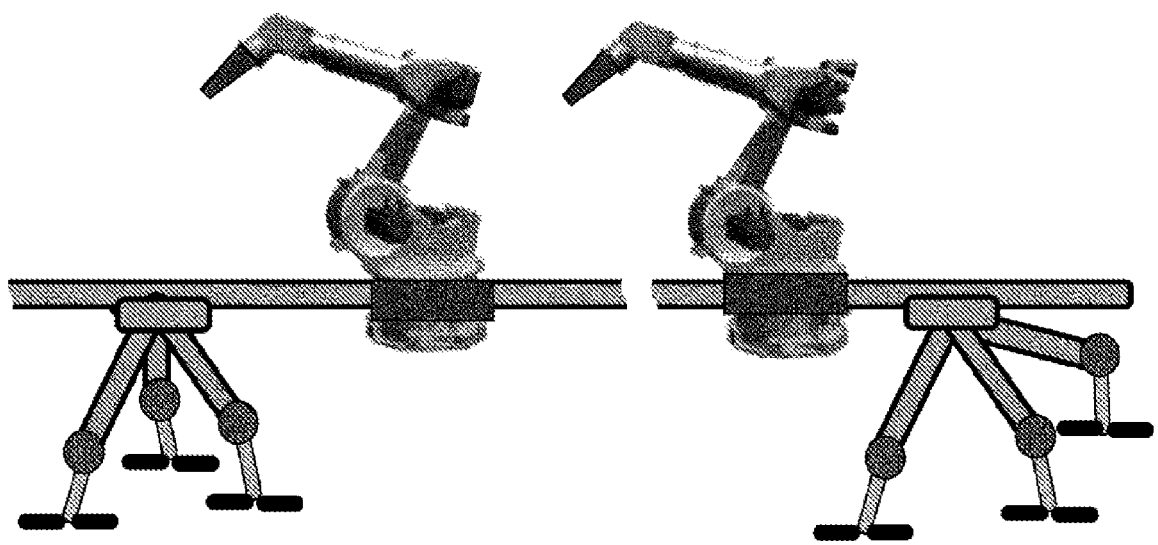

In order to minimize the frequency of the change of the position of the robot, it is also possible to place the robot on a rail and to provide this rail at its respective end with a multi-leg sub-structure, respectively shown in FIG. 44, at the leg ends of which grippers are respectively located.

The robot can thus move simply and quickly along a rail. As can be seen in FIG. 44, multiple robots can also move along a common rail. The rail can also have a greater longitudinal extent or even extend over the entire width of the construction site, legs with grippers being used for fixing at multiple points.

Such a system of 3-D plotter robots can be used universally and, in addition to the creation of marine stores, can also be used for the construction of any desired small and large and even high buildings. The industrial robots needed for this purpose, together with the necessary gripping arms and their activation, are already used industrially in very large numbers.

New Possibilities for Storage Creation

Figure 41:
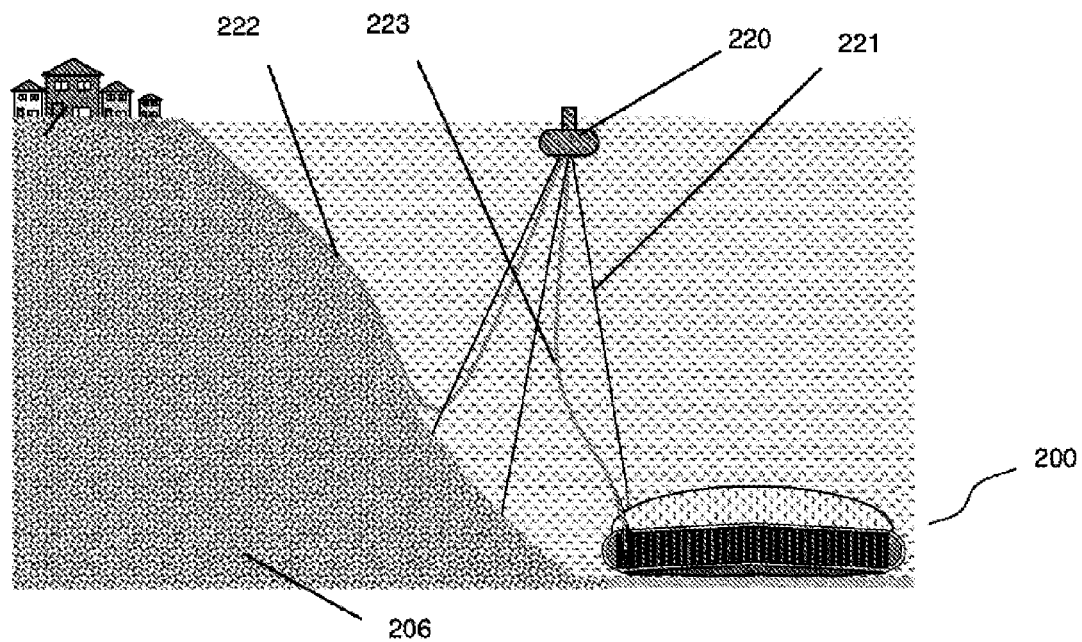
FIG. 41 shows a store with connecting lines to a control and bracing center close underneath the sea surface
Figure 42:
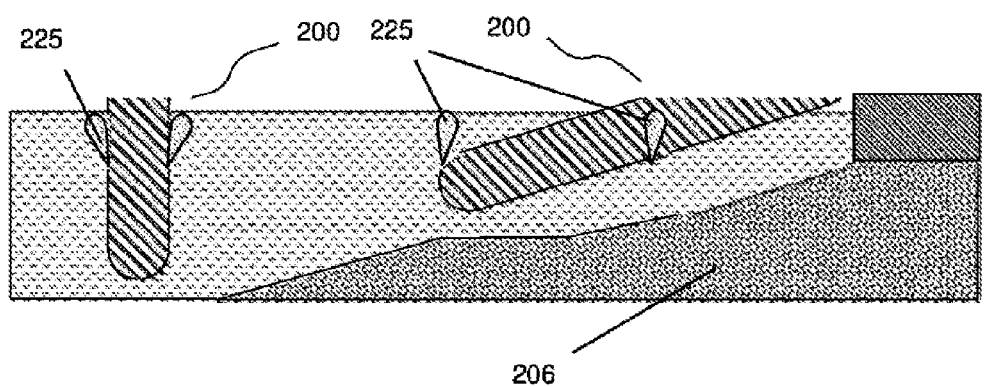
FIG. 42 shows the alternative creation of the store by means of 3-D plotters

The possibility of plotting also results in new possibilities with regard to the type of creation of the store. Thus, it is possible, as shown in FIGS. 41, 42, to create the store in deep water. During the creation, the store can be arranged vertically, as illustrated, or at an angle. The part of the store already created underneath the water surface floats in water and can therefore easily be fixed.

The Following Special Features and Advantages Result from the New Type of 3-D Plotting

- The nature of the material for creating the shuttering can be selected irrespective of the required properties of the actual construction material
- The desired constructional material (high-strength concrete here) must not be created or adapted so as to be capable of plotting, since it is sprayed in a simple way into already finished formwork p1 Only a small fraction of the actual building has to be plotted
  → substantially economical fabrication method
  → substantially higher plotter output, i.e. shorter construction time
- The mobile arrangement of the robot on movable feet needs no auxiliary devices such as rail systems on the building, for example
- Instead of individual mobile robots, these can also be placed on a rail-like arrangement
- In order to maximize the working range, multiple plotter robots can be placed on a commonly used rail

LIST OF DESIGNATIONS

1 Canopy traction rope
2 Canopy control rope
3 Traction kite connecting rope
4 Positioning traction rope
5a Traction rope 1
5b Traction rope 2
5c Fixing the canopy control rope 2 with traction rope 2
6 Rope deflection roller for the force distribution of the two traction ropes
7 Control rope deflection roller for canopy control rope
8 Rotary bearing with internal passage for canopy control rope 2
9 Rope rotator
10 Individual traction kite or vertical flyer windmill
11 Wind direction
12 Twofold rope winch with generator/motor for generating electricity
13 Rope winch of a traction kite at the edge of the kite group for the horizontal control of the kite group
14 Rope deflection roller
15 Tiltably mounted deflection roller
16 Wind direction-dependently vertically rotatably mounted rope deflection roller
17 Rotatable rope guide rails
18 Snorkel for offshore operation with rope winch or mast placed underwater
19 Night-time illumination
20 Generator/motor
21 Rotor
22 Stator
23 Rope drum rope 1
24 Rope drum rope 2
25 Compensating bevel gear between spur toothing of the rope drums
26 Shaft gear
27 Compensating bevel gear
28 Adjusting motor for traction load adaptation
29 Securing frame
30 Rope winch ball bearing
31 Spur toothing
32 Traction kite group
40 Base station with double rope winch, submersible
41 Storm and rain protective cap, rotatably mounted, to accommodate canopy
42 Water surface
43 Water separator prevents penetration of water
44 Canopy capture aid spring wire
45 Storage space of the canopy hauled in during a storm
46 Blower for unfolding canopy
47 Intake channel for blower
S1 . . . S19 Consecutive numbering of individual canopies in a group of traction kites 48 Canopy holder comprising rope deflection roller, rotary bearing and canopy ropes
49 Guide rod for rope guidance when winding up the rope
50 Individual blade of vertical windmill
51 Control rope for rotation-dependent adjustment of the angle of attack
52 Traction rope for adjusting the blade angle of attack
53 Rod for relocating the control rope connection
54 Traction rope for blade
55 Blade deployment rotating forward in the paying-out mode
56 Blade deployment rotating rearward in the sinking mode
57 Anchoring of the base station to the sea floor
58 Blade positioning rope
59 Effective area of the rotor blade
60 Attachment point for control rope
61 Deflection roller
62 Fixing rope
63 Rigid tube as extension of the deflection roller
70 Holding device for flyer wheel, rotatably and vertically pivotable
71 Fold-in holding mast for flyer wheel
72 Flyer wheel holding mast in retracted state
73 Foldable holding clamps for flyer wheel fixing
74 Direction of movement of the flyer wheel during the start
101 Canister with solar liquid
102 Solar liquid
103 Pressure vessel, e.g. spherical
104 Filling cover with integrated pressure release valve
105 Compressed air hose
106 Reverse-flow preventer, about 150 mbar opening pressure, e.g. integrated in ¾ connecting screw fitting for feed into solar system
107 Automatic vent
108 Reverse-flow preventer, about 20 mbar opening pressure
109 Reverse-flow preventer, about 20 mbar opening pressure
110 Filling hose for solar system
111 Refilling hose for refilling the solar liquid out of the canister
112 Suction hose for removal of the solar liquid
113 Compressed air feed for filling and air outlet for refilling
114 Feed into solar system
115 Pressure release valve, e.g. 2-4 bar, integrated in the closing cover
200 Complete marine store
201 Store top, bottom
202 Circular, radial side wall
203
204 Water cushion, divided into three chambers
205 Bottom film of the water cushion
206 Sea floor
207 Stored water enclosed by the film outside the store
208 Machine room
209 Generator/motor
210 Pump turbine
211 Connecting pipe to the external store
212 Connecting pipe to the energy store
213 Shut-off valve, pump to store
214 Shut-off valve, pump to external store
215 Individual honeycomb module for vertical physical support
216 Steel cable for film support
217 Water-jet nozzle for navigating the store during submersion and surfacing
218 Ball valve for switching over the pump turbine to storage operation, water-jet nozzle or leveling the water cushion (204)
219 Annular contact surface
220 Control center and bracing module
221 Bracing rope for anchoring
222 Sea cable for electricity transmission to the coast
223 Connecting cable for electricity transmission and control
224 Connecting channel from pump turbine to surrounding water
225 Buoyancy element
600 Robot of an industrial robot type, placed on movable gripper arms
601 Divided gripper arm, suitable for gripping a, for example, vertical wall
602 Vertical wall
603 Rail for working range expansion and placement of multiple 3-D plotter robots
604 3-D print head for plotting the shuttering and a second nozzle for the filling with concrete

The invention claimed is:

1. A device for a traction kite for generating electricity by means of wind force, wherein exact horizontal positioning of the traction kite is made possible, the device comprising at least one traction rope, and obliquely braced additional traction ropes (4) at edges of the traction kite to permit a fixed position of the traction kite, wherein canopy traction ropes (1) and a canopy control rope (2) are connected between a canopy deflection roller (6) and the traction kite, and at least one rotary bearing (8) is positioned between the canopy deflection roller (6) and the canopy traction ropes (1) and canopy control rope (2) such that, during circular movements of the traction kite, endless rotation of the traction kite is permitted, despite a horizontally rotationally fixed arrangement of rope rollers and entire kite combination (32).

2. The device as claimed in claim 1, wherein the traction kite comprises a group of interconnected traction kites or rotating flyer wheels, and wherein the rotary bearing (8), during circular movements of the group of interconnected traction kites or rotating flyer wheels, permits endless rotation of individual traction kites or rotating flyer wheels.

3. The device as claimed in claim 1, wherein a ratio of the pulling force and rope lengths on positioning ropes surrounding one or a group of traction kites is used to detect the respectively current wind direction.

4. The device as claimed in claim 1, wherein a base station, rope drums, the at least one traction rope and the two additional traction ropes with canopy deflection roller are rotationally fixed to a support surface.

* * * * *